(12) United States Patent
Ozawa

(10) Patent No.: US 11,030,498 B2
(45) Date of Patent: Jun. 8, 2021

(54) CONTROL OF COLOR CONVERSION ON PRINT DATA

(71) Applicant: SEIKO EPSON CORPORATION, Tokyo (JP)

(72) Inventor: Tomonobu Ozawa, Sapporo (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 16/737,583

(22) Filed: Jan. 8, 2020

(65) Prior Publication Data

US 2020/0226437 A1 Jul. 16, 2020

(30) Foreign Application Priority Data

Jan. 11, 2019 (JP) .............................. JP2019-003411

(51) Int. Cl.
*G06K 15/02* (2006.01)
*H04N 1/00* (2006.01)
(Continued)

(52) U.S. Cl.
CPC ....... *G06K 15/1878* (2013.01); *G06K 15/002* (2013.01); *G06K 15/026* (2013.01); (Continued)

(58) Field of Classification Search
CPC ........... H04N 1/00005; H04N 1/00015; H04N 1/00023; H04N 1/00074; H04N 1/00082; H04N 1/0044; H04N 1/2315; H04N 1/233; H04N 1/2338; H04N 1/2392; H04N 1/50; H04N 1/54; H04N 1/56; H04N 1/60; H04N 1/6002; H04N 1/6008; H04N 1/6011; H04N 1/6016; H04N 1/6019; H04N 1/6022; (Continued)

(56) References Cited

U.S. PATENT DOCUMENTS

2004/0001229 A1* 1/2004 Hanyu ............... H04N 1/40062
358/2.1
2012/0050766 A1* 3/2012 Saiki ................... H04N 1/6027
358/1.9
(Continued)

FOREIGN PATENT DOCUMENTS

JP 2008148007 6/2008
JP 2016186690 10/2016

*Primary Examiner* — Scott A Rogers
(74) *Attorney, Agent, or Firm* — Workman Nydegger

(57) ABSTRACT

A PC includes a first set information DB that stores a plurality of pieces of first set information including color conversion information for color-converting first color information into second color information different from the first color information and a print setting corresponding to the color conversion information in association with each other, and a PC control unit that obtains a designation print setting which is a print setting designated for print data, causes a PC display unit to display a color conversion list including one or more options of the color conversion information associated with the print setting corresponding to the obtained designation print setting based on the plurality of pieces of first set information stored in the first set information DB, and controls color conversion to be performed on the print data based on color conversion information selected from the color conversion list.

5 Claims, 19 Drawing Sheets

(51) Int. Cl.
*H04N 1/60* (2006.01)
*G06K 15/00* (2006.01)

(52) U.S. Cl.
CPC ..... *H04N 1/00023* (2013.01); *H04N 1/00042* (2013.01); *H04N 1/0044* (2013.01); *H04N 1/00082* (2013.01); *H04N 1/6008* (2013.01); *H04N 1/6011* (2013.01); *H04N 1/6027* (2013.01); *H04N 1/6072* (2013.01)

(58) Field of Classification Search
CPC .... H04N 1/6025; H04N 1/6027; H04N 1/603; H04N 1/6072; H04N 1/62; H04N 1/622; G06K 15/002; G06K 15/005; G06K 15/007; G06K 15/025; G06K 15/027; G06K 15/026; G06K 15/1878; G06K 15/1882; G06K 15/1884
See application file for complete search history.

(56) References Cited

U.S. PATENT DOCUMENTS

2018/0063381 A1* 3/2018 Takesue .................. G01J 3/524
2020/0226436 A1* 7/2020 Ozawa ................. H04N 1/6008

* cited by examiner

FIG. 3

| REGISTRATION NUMBER | FIRST SET INFORMATION ||||| 
|---|---|---|---|---|---|
| | FIRST COLOR CONVERSION RELATION INFORMATION |||| PRINT SETTING INFORMATION ||
| | NAME | COLOR CONVERSION INFORMATION || PRINT QUALITY | PAPER TYPE | PRINT DENSITY |
| | | COLOR INFORMATION BEFORE CONVERSION (R, G, B) | COLOR INFORMATION AFTER CONVERSION (R', G', B') | | | |
| 1 | A_Corp_ProdLabel | (100, 100, 100) | (105, 105, 105) | FAST | PLAIN PAPER | 0 |
| 2 | B_Hosp_YakutaiLabel | (50, 50, 200) | (45, 45, 205) | FAST | PLAIN PAPER | 0 |
| 3 | C_Phar_YakutaiLabel | (200, 200, 100) | (205, 205, 95) | FAST | PLAIN PAPER | 0 |
| 4 | B_Hosp_TentekiLabel | (100, 200, 50) | (105, 205, 55) | CLEAN | PLAIN PAPER | 0 |
| 5 | B_Hosp_KentaiLabel | (50, 200, 100) | (45, 9180, 90) | CLEAN | PLAIN PAPER | 0 |
| 6 | A_Corp_HiProd001Label | (100, 100, 100) (200, 200, 100) | (95, 95, 95) (180, 180, 90) | CLEAN | GLOSSY PAPER | 2 |
| 7 | A_Corp_HiProd002Label | (100, 100, 100) (50, 100, 200) | (105, 105, 100) (55, 105, 200) | CLEAN | GLOSSY PAPER | 1 |

FIG. 4

| REGISTRATION NUMBER | SECOND SET INFORMATION | |
|---|---|---|
| | COLOR CONVERSION INFORMATION | |
| | COLOR INFORMATION BEFORE CONVERSION (R, G, B) | COLOR INFORMATION AFTER CONVERSION (R', G', B') |
| 1 | (100, 100, 100) | (105, 105, 105) |
| 2 | (50, 50, 200) | (45, 45, 205) |
| 3 | (200, 200, 100) | (205, 205, 95) |
| 4 | (100, 200, 50) | (105, 205, 55) |
| 5 | (50, 200, 100) | (45, 9180, 90) |
| 6 | (100, 100, 100) | (95, 95, 95) |
| | (200, 200, 100) | (180, 180, 90) |
| 7 | (100, 100, 100) | (105, 105, 100) |
| | (50, 100, 200) | (55, 105, 200) |

FIG. 13

| REGISTRATION NUMBER | NAME | THIRD SET INFORMATION ||
|---|---|---|---|
| | | COLOR CONVERSION INFORMATION ||
| | | COLOR INFORMATION BEFORE CONVERSION (R, G, B) | COLOR INFORMATION AFTER CONVERSION (R', G', B') |
| 1 | A_Corp_ProdLabel | (100, 100, 100) | (105, 105, 105) |
| 2 | B_Hosp_YakutaiLabel | (50, 50, 200) | (45, 45, 205) |
| 3 | C_Phar_YakutaiLabel | (200, 200, 100) | (205, 205, 95) |
| 4 | B_Hosp_TentekiLabel | (100, 200, 50) | (105, 205, 55) |
| 5 | B_Hosp_KentaiLabel | (50, 200, 100) | (45, 9180, 90) |
| 6 | A_Corp_HiProd001Label | (100, 100, 100) (200, 200, 100) | (95, 95, 95) (180, 180, 90) |
| 7 | A_Corp_HiProd002Label | (100, 100, 100) (50, 100, 200) | (105, 105, 100) (55, 105, 200) |

CONTROL OF COLOR CONVERSION ON PRINT DATA

The present application is based on, and claims priority from JP Application Serial Number 2019-003411, filed Jan. 11, 2019, the disclosure of which is hereby incorporated by reference herein in its entirety.

BACKGROUND

1. Technical Field

The present disclosure relates to a printing control apparatus, a printing apparatus, a printing system, and a non-transitory computer-readable storage medium storing a program.

2. Related Art

In the related art, as described in JP-A-2016-186690, there is known a printing control apparatus which stores a plurality of pieces of color conversion information in which color information before color conversion and color information after the color conversion are associated with each other and performs color conversion on print data by using color conversion information selected from the plurality of pieces of color conversion information.

In the printing control apparatus in the related art, it is necessary for a user to consider a print setting and the like for print data and to select color conversion information from the plurality of pieces of color conversion information, and therefore, an interface for the user more simply selecting the color conversion information according to the print setting and the like is required.

SUMMARY

According to an aspect of the present disclosure, there is provided a printing control apparatus including: a storage unit configured to store a plurality of pieces of correspondence information including color conversion information for color-converting first color information into second color information different from the first color information and a print setting corresponding to the color conversion information in association with each other; a print setting obtainment unit configured to obtain a designation print setting which is a print setting designated for print data; and a control unit configured to cause the display unit to display a color conversion list including one or more options of color conversion information associated with the print setting corresponding to the obtained designation print setting based on the plurality of pieces of correspondence information stored in the storage unit and control color conversion to be performed on the print data based on color conversion information selected from the color conversion list.

According to another aspect of the present disclosure, there is provided a printing apparatus including: a printing unit configured to execute printing; a storage unit configured to store a plurality of pieces of correspondence information including color conversion information for color-converting first color information into second color information different from the first color information and a print setting corresponding to the color conversion information in association with each other; a print data obtainment unit configured to obtain print data; a print setting obtainment unit configured to obtain a designation print setting which is a print setting designated for the print data; and a printing apparatus control unit configured to cause a display unit to display a color conversion list including one or more options of color conversion information associated with the print setting corresponding to the obtained designation print setting based on the plurality of pieces of correspondence information stored in the storage unit, perform color conversion on the obtained print data based on color conversion information selected from the color conversion list, and cause a printing unit to execute printing based on image data obtained by performing color conversion on the print data.

According to still another aspect of the present disclosure, there is provided a printing system including: a printing apparatus configured to store a plurality of pieces of color conversion information for color-converting first color information into second color information different from the first color information; and a printing control apparatus configured to perform print control on the printing apparatus. The printing control apparatus includes a storage unit configured to store a plurality of pieces of correspondence information including the plurality of pieces of color conversion information stored in the printing apparatus and print settings corresponding to the plurality of pieces of color conversion information in association with each other, a print setting obtainment unit configured to obtain a designation print setting which is a print setting designated for print data, and a control apparatus control unit configured to cause a display unit to display a color conversion list including one or more options of color conversion information associated with the print setting corresponding to the obtained designation print setting based on the plurality of pieces of correspondence information stored in the storage unit and transmit the print data including designation information for designating color conversion information selected from the color conversion list. The printing apparatus includes a printing apparatus control unit configured to read the color conversion information designated by the designation information included in the obtained print data among the plurality of pieces of color conversion information stored in the printing apparatus, perform color conversion on the obtained print data based on the read color conversion information, and cause a printing unit to execute printing based on image data obtained by performing color conversion on the print data.

According to still another aspect of the present disclosure, there is provided a non-transitory computer-readable storage medium storing a program that causes a computer, including a storage unit that stores a plurality of pieces of correspondence information including color conversion information for color-converting first color information into second color information different from the first color information and a print setting corresponding to the color conversion information in association with each other, to execute: obtaining a designation print setting designated for print data; and causing a display unit to display a color conversion list including one or more options of color conversion information associated with the print data corresponding to the obtained designation print setting based on the plurality of pieces of correspondence information stored in the storage unit and controlling color conversion to be performed on the print data based on color conversion information selected from the color conversion list.

BRIEF DESCRIPTION OF THE DRAWINGS

FIG. 3 is a diagram illustrating an example of first set information.

FIG. 4 is a diagram illustrating an example of second set information.

FIG. 13 is a diagram illustrating an example of third set information.

DESCRIPTION OF EXEMPLARY EMBODIMENTS

First Embodiment

Figure 1:
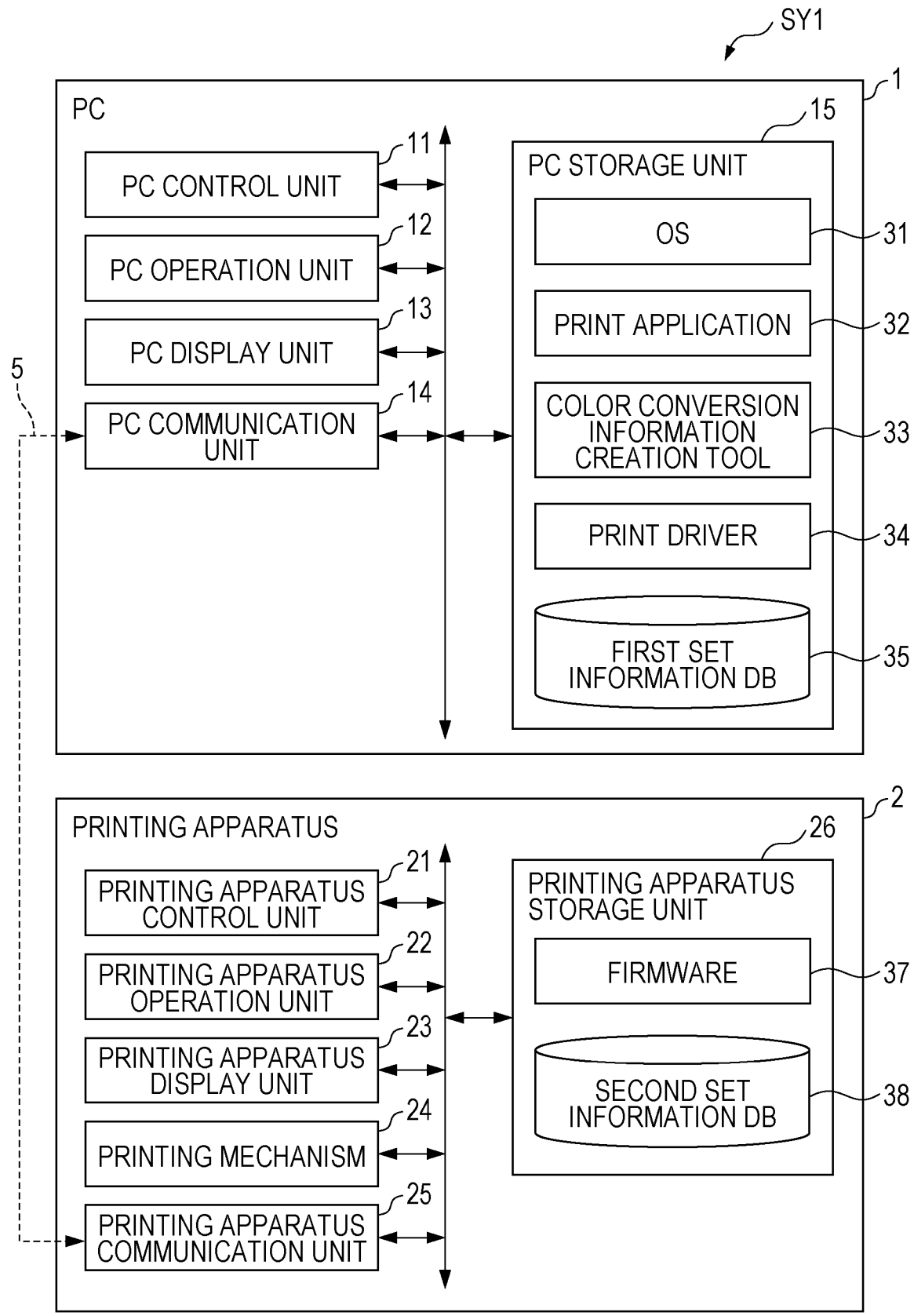
FIG. 1 is a block diagram of a first printing system according to a first embodiment.

Hereinafter, a printing control apparatus, a printing apparatus, a printing system, and a non-transitory computer-readable storage medium storing a program according to an embodiment will be described with reference to the drawings. FIG. 1 is a diagram of a system configuration of a first printing system SY1 according to a first embodiment. The first printing system SY1 includes one or more personal computers (PCs) 1, one or more printing apparatuses 2, and a communication line 5 which connects the PC 1 and the printing apparatus 2. FIG. 1 illustrates the first printing system SY1 including one PC 1 and one printing apparatus 2, but the number of the PCs 1 and the printing apparatuses 2 included in the first printing system SY1 may not be the same. The PC 1 is an example of "printing control apparatus" and "computer". Instead of the communication line 5, one or more of the PCs 1 and one or more printing apparatuses 2 may be connected with each other by a network such as a local area network (LAN) or the like.

The PC 1 generates print data, and transmits the generated print data to the printing apparatus 2. The generation of the print data and the transmission of the print data are an example of "print control". The printing apparatus 2 performs an image process such as a color conversion process or the like on the print data obtained from the PC 1 so as to generate image data, and performs printing based on the generated image data. The printing apparatus 2 is not specifically limited, and is a label printer for generating a medical label or a product label, for example.

The printing apparatus 2 according to the present embodiment performs a color conversion process based on color conversion information registered in advance, as a part of a color conversion process. The color conversion information is information for converting color information, and is information for converting color information (R, G, and B) before conversion into color information (R', G', and B') after conversion. That is, a color conversion process based on color conversion information indicates a process of rewriting color information which coincides with color information before conversion registered in advance into color information after conversion registered in advance, in the print data. In this manner, by performing the color conversion process based on the color conversion information, it is possible to delete a difference between a color of print data generated in the PC 1 and a color of a printout obtained by actually printing the print data. Accordingly, in a case of generating a printout requiring precise color reproduction such as a printout including a product logo or a logotype, it is possible to print with an accurate color desired by a user. The color information before conversion is an example of "first color information", and the color information after conversion is an example of "second color information". In addition, in the following description, conversion of color information is also referred to as "color conversion".

The PC 1 includes a PC control unit 11, a PC operation unit 12, a PC display unit 13, a PC communication unit 14, and a PC storage unit 15 as a main hardware configuration. The PC control unit 11 is an example of "print setting obtainment unit", "control unit", and "control apparatus control unit". In addition, the PC display unit 13 is an example of "display unit". Further, the PC storage unit 15 is an example of "storage unit".

The PC control unit 11 includes read only memory (ROM), random access memory (RAM), and the like in addition to a processor such as a central processing unit (CPU) or the like, and controls each unit in the PC 1 by the processor executing a program stored in the ROM, the RAM, or the like. The processor may be configured to include a plurality of CPUs or a hardware circuit such as an application specific integrated circuit (ASIC) or the like. In addition, the processor may be configured such that one or more CPUs and a hardware circuit such as an ASIC operate in cooperation.

The PC operation unit 12 is, for example, a keyboard or a mouse, and is used by a user to perform various operations such as generation of color conversion information or a print setting. The PC display unit 13 is a liquid crystal display, for example, and displays various kinds of information such as a first color conversion information creation screen D1 (see FIG. 2) or a print setting screen D2 (see FIGS. 5 and 6) to be described below. The PC communication unit 14 communicates with the printing apparatus 2 via the communication line 5.

The PC storage unit 15 is, for example, a storage device such as a hard disk drive (HDD) or the like, and stores an operating system (OS) 31, a print application 32, a color conversion information creation tool 33, a print driver 34, a first set information database 35, and the like. Hereinafter, the database is referred to as "DB". Further, the print driver 34 is an example of "program".

The OS 31 is basic software for operating various application programs such as the print application 32. The print application 32 is an application program for generating an image, a document, or the like to be printed. The color conversion information creation tool 33 is an application program for generating color conversion information. The first color conversion information creation screen D1 (see FIG. 2) to be described below is an operation screen of the color conversion information creation tool 33. The print driver 34 is an application program for performing print control of the printing apparatus 2 such as generation of print data of a command system interpretable by the printing apparatus 2. The print setting screen D2 (see FIGS. 5 and 6) to be described below is an operation screen of the print driver 34. The first set information DB 35 stores first set information (see FIG. 3) to be described below. The first set information is an example of "correspondence information".

The printing apparatus 2 includes a printing apparatus control unit 21, a printing apparatus operation unit 22, a printing apparatus display unit 23, a printing mechanism 24, a printing apparatus communication unit 25, and a printing apparatus storage unit 26 as a main hardware configuration. A printing method of the printing apparatus 2 is not particularly limited, and for example, an ink jet method, an electrophotographic method, a thermal transfer method, a thermal method, or the like can be used. The printing mechanism 24 is an example of "printing unit".

The printing apparatus control unit 21 includes a processor such as a CPU or the like, ROM, RAM, and the like, and controls each unit in the printing apparatus 2 by the processor executing a program stored in the ROM, the RAM, or the like. The processor may be configured to include a plurality of CPUs or a hardware circuit such as an ASIC or the like. In addition, the processor may be configured such that one or more CPUs and a hardware circuit such as an ASIC operate in cooperation.

The printing apparatus operation unit 22 is used for a user to perform various operations on the printing apparatus 2. The printing apparatus display unit 23 displays various kinds of information. The printing apparatus operation unit 22 and the printing apparatus display unit 23 may be configured to include a common member, for example, a touch panel type operation panel. The printing mechanism 24 is a printer engine which performs print on a printing medium such as label paper or the like. For example, when the printing apparatus 2 is an ink jet printer, the printing mechanism 24 includes an ink jet head, a head driving mechanism, a printing medium transport mechanism, and the like. The printing apparatus communication unit 25 communicates with the PC 1 via the communication line 5.

The printing apparatus storage unit 26 is, for example, a storage device such as flash memory or the like, and stores firmware 37, a second set information DB 38, and the like. The firmware 37 is a control program for controlling the printing apparatus 2. The printing apparatus control unit 21 performs an image process on print data or print control on the printing mechanism 24, based on the firmware 37. The second set information DB 38 stores second set information (see FIG. 4) to be described below.

Figure 2:
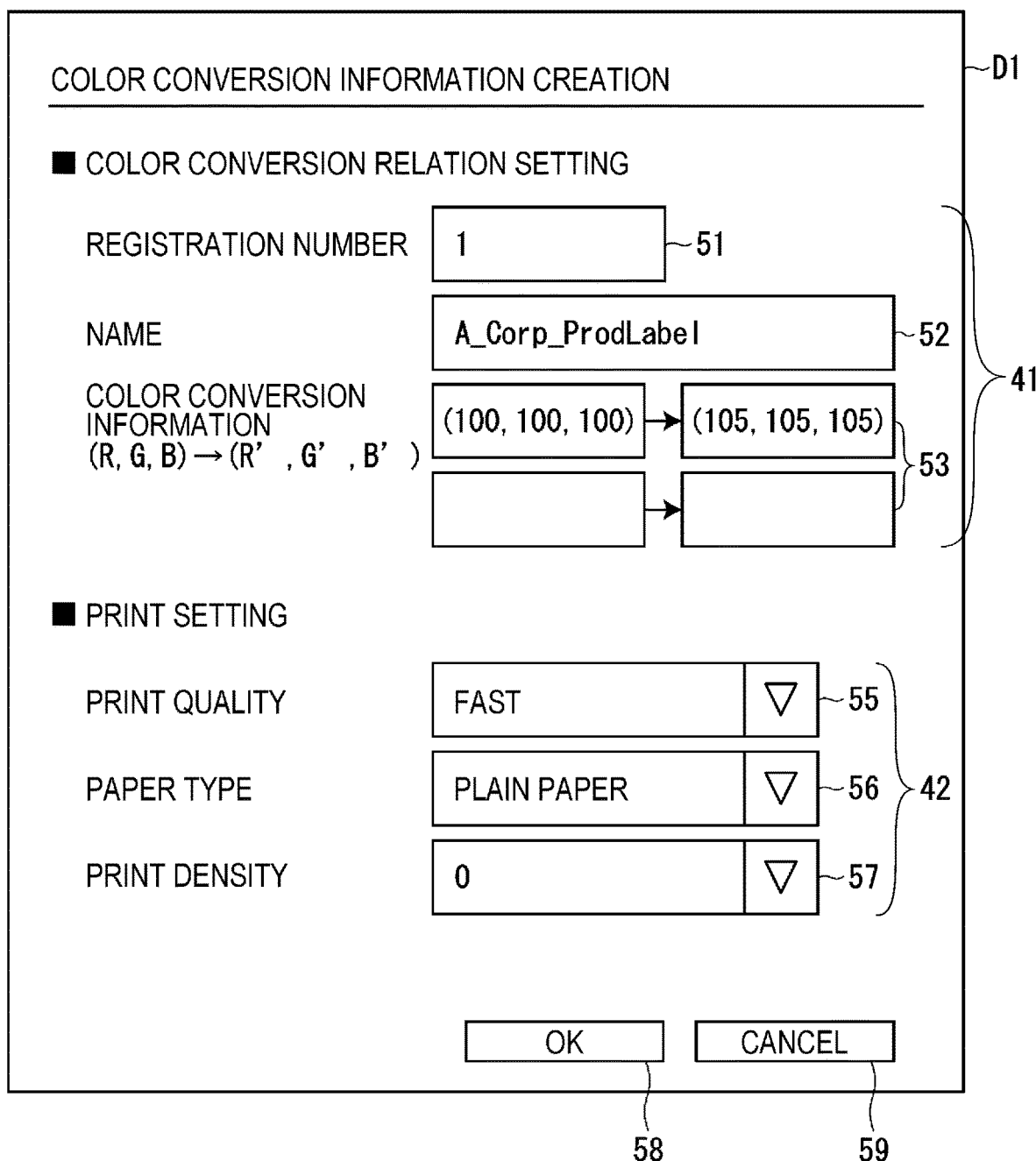
FIG. 2 is a diagram illustrating an example of a first color conversion information creation screen.

FIG. 2 is a diagram illustrating an example of the first color conversion information creation screen D1 displayed on the PC display unit 13. The first color conversion information creation screen D1 is a screen for generating the first set information to be described below. The first color conversion information creation screen D1 includes a color conversion relation setting area 41, and a print setting area 42. In the color conversion relation setting area 41, color conversion information is set, and information on the color conversion information is set. Further, in the print setting area 42, a print setting appropriate to the color conversion information set in the color conversion relation setting area 41 is performed. Hereinafter, the print setting set in the print setting area 42 of the first color conversion information creation screen D1 is referred to as "appropriate print setting".

In the color conversion relation setting area 41, a registration number input field 51, a name input field 52, and a color conversion information input field 53 are displayed. A registration number of color conversion information, that is, a registration number of first set information to be described below is input to the registration number input field 51. The registration number is an example of "designation information". The registration number input field 51 may be configured such that a registration number is not input by a user but a number automatically assigned by the PC control unit 11 is input.

A name of the color conversion information is input to the name input field 52. A name of the color conversion information is an example of "color conversion options". The color information (R, G, and B) before conversion and the color information (R', G', and B') after conversion are input to the color conversion information input field 53 in association with each other. The color information (R, G, and B) before conversion and the color information (R', G', and B') after conversion are represented by a color value having 1 byte, that is, 256 stages, for example.

The color conversion information input field 53 may be configured such that the color value of the color information after conversion is not input but a patch number corresponding to the color information after conversion is input. In this case, the PC control unit 11 causes the printing apparatus 2 to print a patch table (not illustrated) in which a plurality of patches having different color values are arranged together with patch numbers by using the color conversion information creation tool 33, and a user may input a patch number of a desired color value while seeing the patch table. As illustrated in FIG. 2, a plurality of color conversion information input fields 53 are provided, and it is possible to input a plurality of pieces of color conversion information.

In the print setting area 42, a first print quality selection field 55, a first paper type selection field 56, and a first print density selection field 57 are displayed. In the first print quality selection field 55, one of a plurality of options including "fast" and "clean" is selected as a print quality. In the first paper type selection field 56, one of a plurality of options including "plain paper" and "glossy paper" is selected as a paper type. In the first print density selection field 57, one of a plurality of options including "0", "1", and "2" is selected as a print density. For example, when the printing apparatus 2 is an ink jet printer, the print density corresponds to the ink ejection amount per pixel, and the higher the numerical value, the larger the ink ejection amount per pixel. A type of setting items and options set in the print setting area 42 is an example, and is not limited thereto. For example, resolution, a data format, a color setting, and the like of print data may be set in the print setting area 42.

When the user selects a first OK button 58 on the first color conversion information creation screen D1, the PC control unit 11 generates first set information to be described below on the basis of the setting on the first color conversion information creation screen D1, and registers the generated first set information in the first set information DB 35. In addition, when the user selects a first cancel button 59, the PC control unit 11 cancels the setting on the first color conversion information creation screen D1.

FIG. 3 is a diagram illustrating an example of first set information. The first set information includes first color conversion relation information based on a setting content in the color conversion relation setting area 41 and print setting information based on a setting content in the print setting area 42, in the first color conversion information creation screen D1. Further, the first color conversion relation information includes a registration number and a name of color conversion information, and the color conversion information. The color conversion information includes color information before conversion and color information after conversion. As described in registration numbers of "6" and "7" in the first set information, a plurality of pieces of color conversion information are set to one registration number, in some cases.

FIG. 4 is a diagram illustrating an example of second set information. The second set information includes a registration number and color conversion information. The second set information registered in the second set information DB 38 is information obtained by extracting a registration number and color conversion information in first color conversion relation information from first set information registered in the first set information DB 35.

Figure 5:
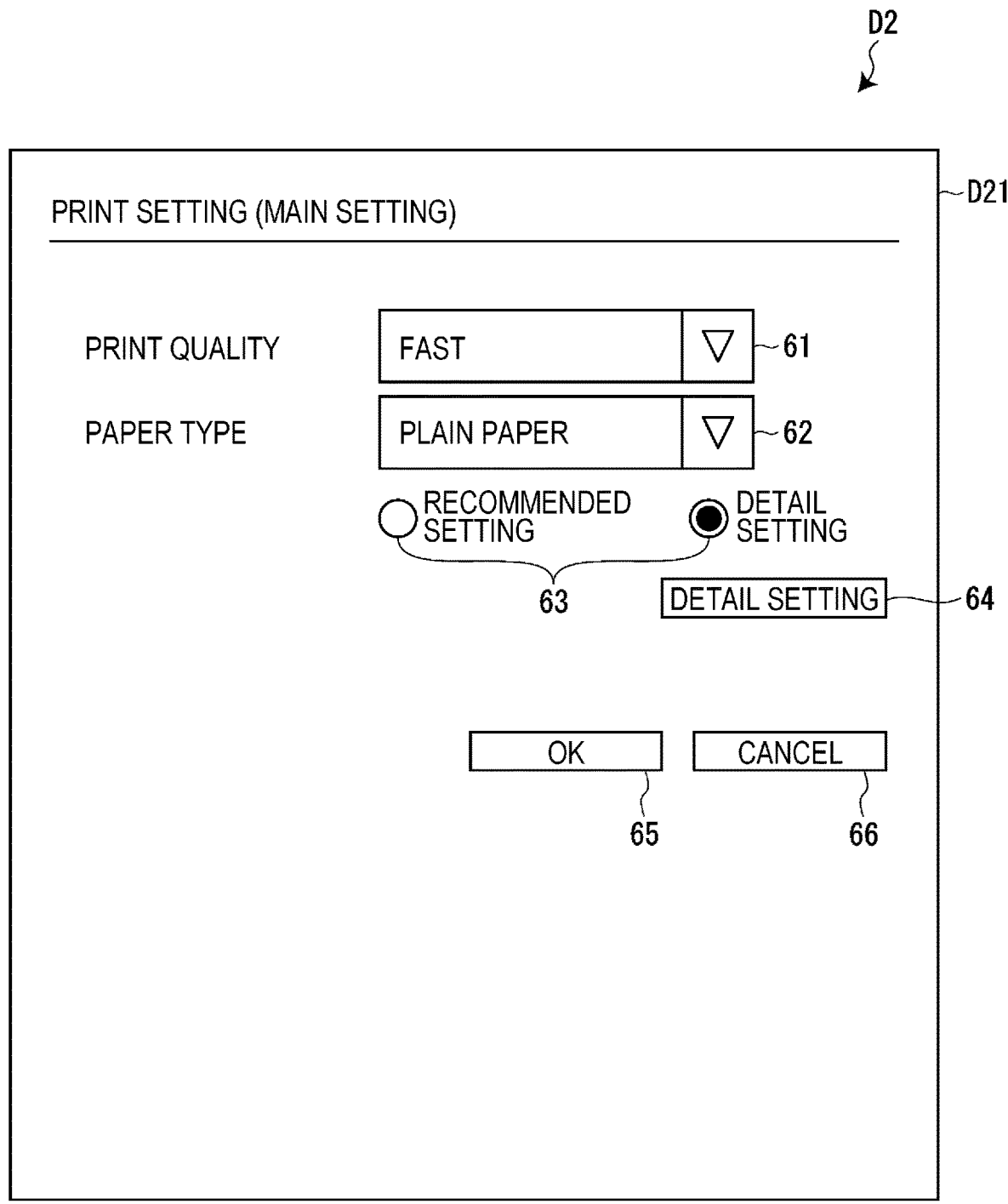
FIG. 5 is a diagram illustrating an example of a main setting screen.
Figure 6:
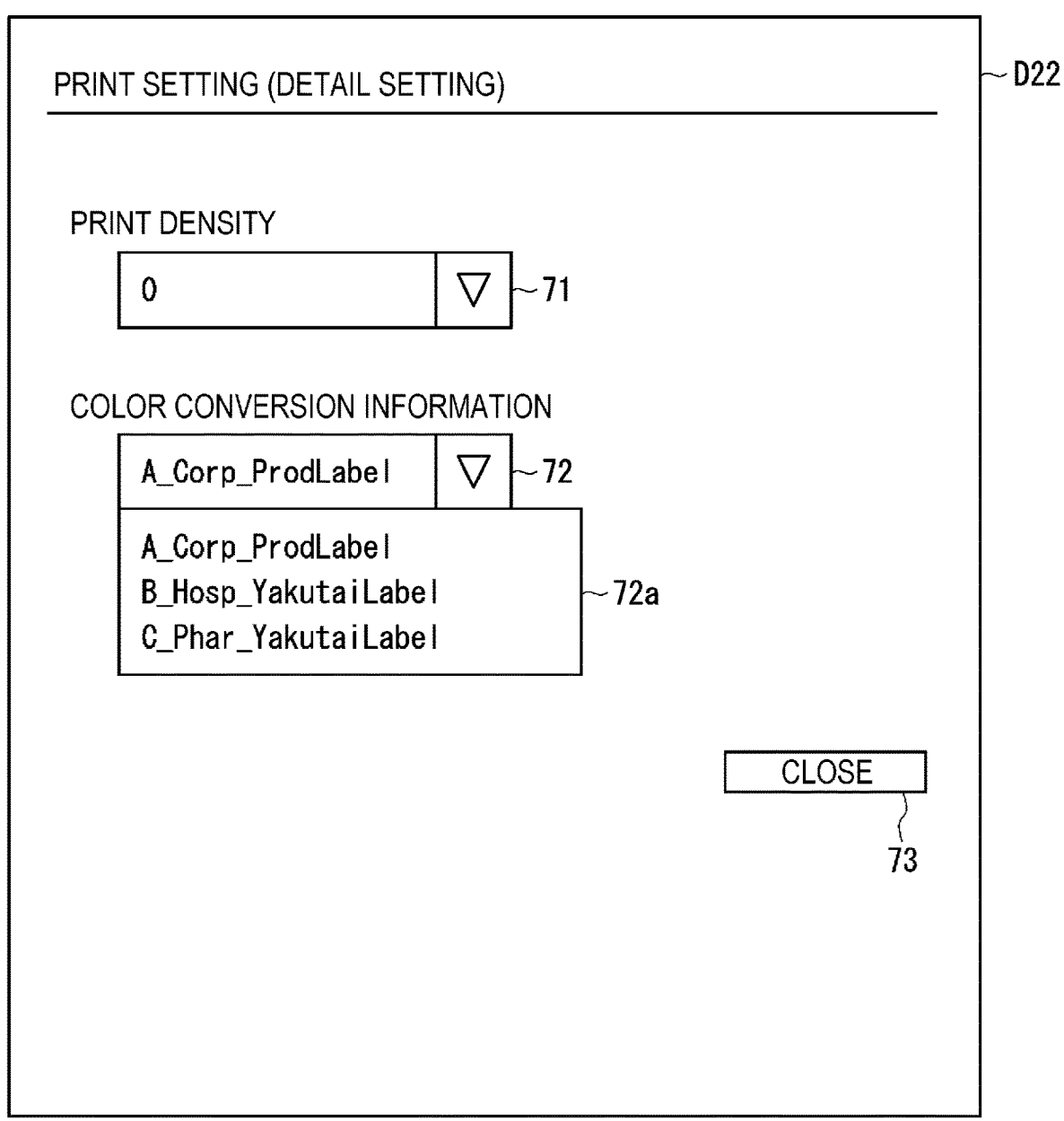
FIG. 6 is a diagram illustrating an example of a first detail setting screen according to the first embodiment.

FIGS. 5 and 6 are diagrams illustrating an example of the print setting screen D2 displayed on the PC display unit 13. The print setting screen D2 is a screen for performing a print setting of designating print data when printing the print data. In the print setting screen D2, a print setting set in a selection field other than a color conversion information selection field 72 (see FIG. 6) is referred to as "designation print setting" as distinguished from "appropriate print setting" set in the first color conversion information creation screen D1. The print setting screen D2 includes a main setting screen D21 (see FIG. 5) and a first detail setting screen D22 (see FIG. 6) configured to transit from the main setting screen D21.

The main setting screen D21 includes a second print quality selection field 61, a second paper type selection field 62, a setting selection radio button 63, a detail setting button 64, a second OK button 65, and a second cancel button 66. In the second print quality selection field 61 and the second paper type selection field 62, options similar to those in the first print quality selection field 55 and the first paper type selection field 56 of the first color conversion information creation screen D1 are displayed. The setting selection radio button 63 includes a "recommended setting" and a "detail setting" to allow the user to select one of the settings. When "recommended setting" is selected, a recommended print setting excluding print quality and a paper type and set in advance is designated for print data. In addition, when "detail setting" is selected, a print setting set on the first detail setting screen D22 (see FIG. 6) is designated for print data.

When "detail setting" is selected by the setting selection radio button 63 and the detail setting button 64 is selected, the PC control unit 11 displays the first detail setting screen D22. In addition, when the second OK button 65 is selected, the PC control unit 11 confirms a setting on the print setting screen D2. Further, when the second cancel button 66 is selected, the PC control unit 11 cancels the setting on the print setting screen D2.

FIG. 6 is a diagram illustrating an example of the first detail setting screen D22. In the first detail setting screen D22, a second print density selection field 71, the color conversion information selection field 72, and a close button 73 are displayed. In the second print density selection field 71, options similar to those in the first print density selection field 57 of the first color conversion information creation screen D1 are displayed.

In the color conversion information selection field 72, options of color conversion information used for color conversion are displayed as a drop-down list. Hereinafter, the drop-down list of the color conversion information selection field 72 is referred to as "color conversion list 72*a*". Based on first set information stored in the first set information DB 35, the PC control unit 11 displays names of one or more pieces of color conversion information associated with an appropriate print setting corresponding to the obtained designation print setting, in the color conversion list 72*a*. The designation print setting is a setting of the second print quality selection field 61, the second paper type selection field 62, and the second print density selection field 71. Hereinafter, a name of the color conversion information displayed in the color conversion list 72*a* is referred to as "color conversion option". The color conversion option is an example of "color conversion information option". When a plurality of color conversion options are displays in the color conversion list 72*a*, the PC control unit 11 displays the plurality of color conversion options in order according to a registration number of the corresponding color conversion information.

For example, when the first set information illustrated in FIG. 3 is registered in the first set information DB 35, and "print quality: fast", "paper type: plain paper", and "print density: 0" are obtained as a designation print setting, the PC control unit 11 displays a name of color conversion information having registration numbers of "1", "2", and "3" matching all of the three settings, in the color conversion list 72*a*. When it is assumed that the first set information which matches all of the three settings is not registered in the first set information DB 35, the PC control unit 11 does not display the color conversion list 72*a*. In this manner, in the color conversion information selection field 72, it is possible to select only the color conversion information appropriate to the print setting set on the print setting screen D2. When the close button 73 on the first detail setting screen D22 is selected, the PC control unit 11 confirms the setting of the first detail setting screen D22 and hides the first detail setting screen D22.

Figure 7:
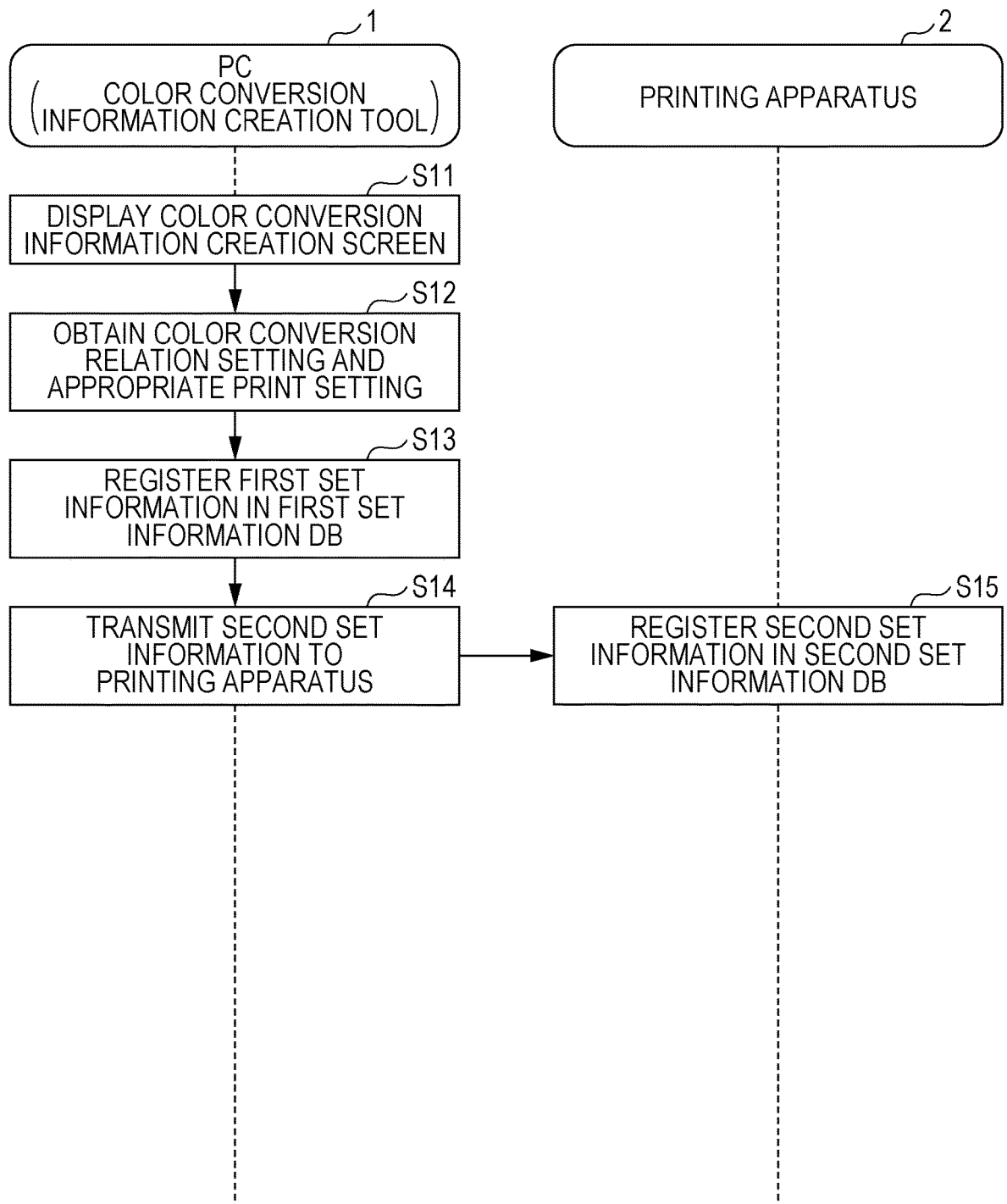
FIG. 7 is a flowchart illustrating a flow of a registration process according to the first embodiment.

FIG. 7 is a flowchart illustrating a flow of a registration process according to the first embodiment. In the registration process, the PC control unit 11 performs a process mainly based on the color conversion information creation tool 33. Further, in the registration process, first set information and second set information are registered.

The PC control unit 11 displays the first color conversion information creation screen D1 (see FIG. 2) (S11), and obtains a color conversion relation setting and an appropriate print setting by a user operation (S12). Further, the PC control unit 11 generates first set information based on the obtained color conversion relation setting and appropriate print setting, and registers the generated first set information in the first set information DB 35 (S13). In addition, the PC control unit 11 transmits the second set information obtained by extracting a registration number and color conversion information in first color conversion relation information from the first set information, to the printing apparatus 2 (S14). The printing apparatus 2 registers the second set information obtained from the PC 1, in the second set information DB 38 (S15).

Figure 8:
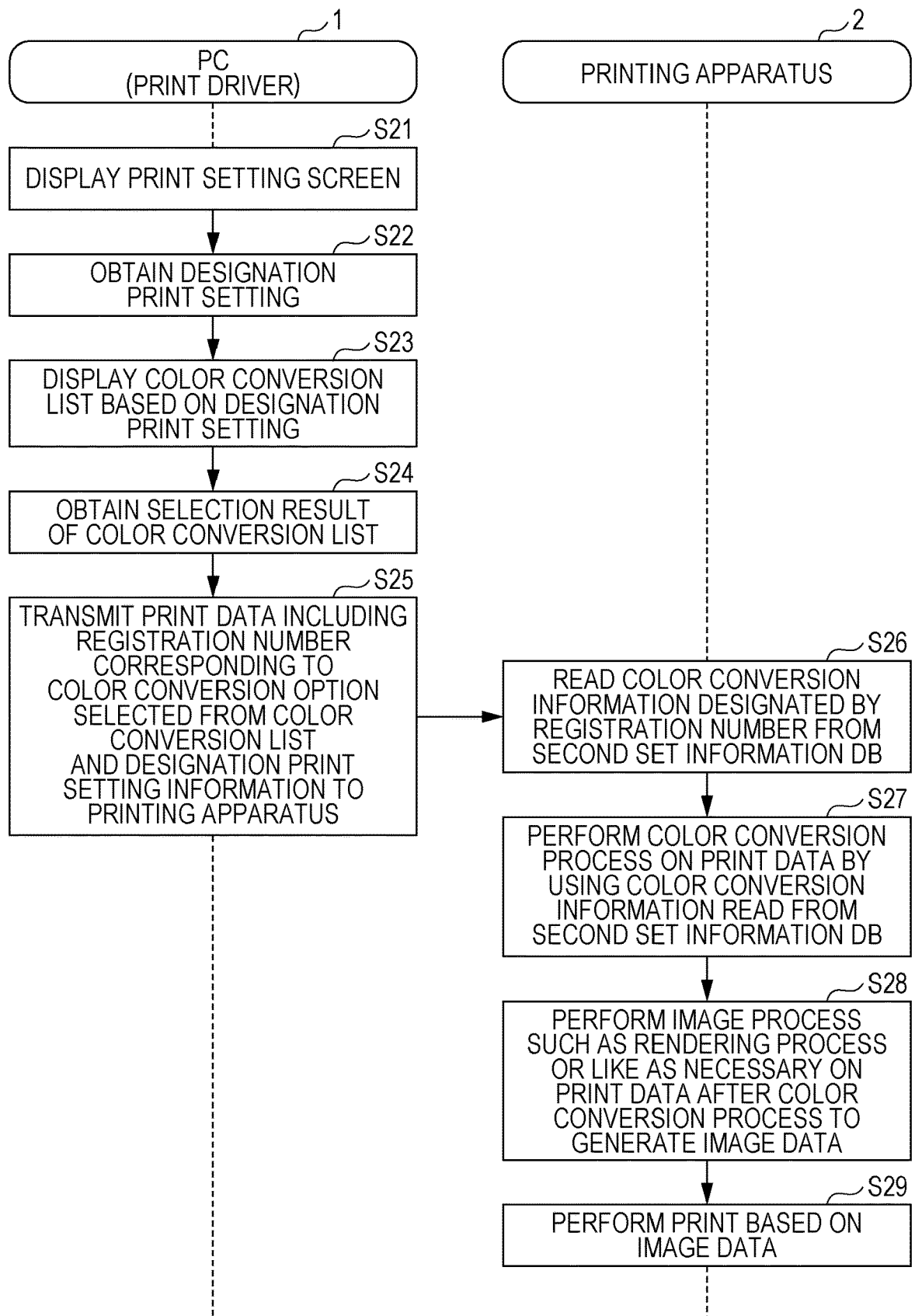
FIG. 8 is a flowchart illustrating a flow of a printing process according to the first embodiment.

FIG. 8 is a flowchart illustrating a flow of a printing process according to the first embodiment. Here, it is assumed that the first set information is registered in the first set information DB 35 and the second set information is registered in the second set information DB 38 by the registration process illustrated in FIG. 7. In the printing process, the PC control unit 11 performs a process mainly based on the print driver 34.

The PC control unit 11 displays the print setting screen D2 (see FIGS. 5 and 6) (S21), and obtains a designation print setting by a user operation (S22). In addition, based on the obtained designation print setting, the PC control unit 11 displays the color conversion list 72a in the color conversion information selection field 72 (S23). The PC control unit 11 obtains a selection result of the color conversion list 72a by a user operation (S24), and transmits print data including a registration number of color conversion information corresponding to a color conversion option selected from the color conversion list 72a and designation print setting information indicating a designation print setting, to the printing apparatus 2 (S25).

For example, as illustrated in FIG. 6, when a name of "A_Corp_ProdLabel" is selected from the color conversion list 72a as the color conversion option, a registration number of color conversion information having the name of "A_Corp_ProdLabel" is "1" as illustrated in FIG. 3, so that the PC control unit 11 transmits print data having the registration number of "1". In the present embodiment, the registration number and the designation print setting information are included in the print data as header information of the print data, but the registration number and the designation print setting information may be transmitted separately from the print data.

Further, it is assumed that the print data transmitted in S25 is a command for drawing an image, a text, a figure, and the like and includes a drawing command in a command system interpretable by the printing apparatus 2. Here, "image" refers to an image represented as a collection of pixels. In addition, the process in S25 is an example of "controlling color conversion to be performed on print data based on color conversion information selected from color conversion list".

When print data is obtained from the PC 1, the printing apparatus control unit 21 reads the color conversion information designated by the registration number, from the second set information DB 38 (S26). In addition, the printing apparatus control unit 21 performs a color conversion process on the obtained print data by using the color conversion information read from the second set information DB 38 (S27).

Here, the printing apparatus control unit 21 performs the color conversion by rewriting color designation included in the drawing command of the print data. More specifically, the printing apparatus control unit 21 rewrites color information which coincides with color information before conversion included in the read color conversion information, among the color information included in the drawing command, into color information after conversion included in the read color conversion information. For example, when the drawing command in the print data is a command of drawing an image, the printing apparatus control unit 21 rewrites color information for each pixel included in the drawing command. Further, when the drawing command in the print data is a command of drawing a text or a figure, the printing apparatus control unit 21 rewrites color information designated by the drawing command. In the color conversion process, the printing apparatus control unit 21 does not perform the color conversion process based on the color conversion information read from the second set information DB 38, on color information which does not coincide with color information before conversion included in the read color conversion information, among the color information included in the drawing command.

When the color conversion process is completed, the printing apparatus control unit 21 performs an image process such as a rendering process on print data after the color conversion process as necessary so as to generate image data (S28). The rendering process is a process of converting print data into bitmap data. In S28, the image process such as color tone correction, gradation correction, or the like is performed based on designation print setting information included in the print data. Further, in S28, a process of converting from an RGB color system to a CMYK color system, a halftone process, and an interlacing process are also performed. The conversion from the RGB color system to the CMYK color system is performed by converting RGB data after a rendering process into CMYK data using a known color conversion lookup table (LUT). The printing apparatus control unit 21 performs print, based on the generated image data (S29).

As described above, the PC 1 according to the first embodiment extracts one or more pieces of color conversion information associated with an appropriate print setting corresponding to a designation print setting designated by a user from a plurality of pieces of color conversion information stored in the first set information DB 35, and displays one or more color conversion options corresponding to the extracted one or more pieces of color conversion information in the color conversion list 72a. With this configuration, as compared when color conversion options corresponding to all color conversion information stored in the first set information DB 35 are displayed, it is possible to reduce the number of the options. Accordingly, it is possible to easily select the color conversion information and to reduce erroneous selection.

In addition, since the PC 1 includes a registration number for designating color conversion information instead of the color conversion information itself, in print data to be transmitted to the printing apparatus 2, it is possible to reduce the amount of data transmission. On the other hand, since the printing apparatus 2 uses the color conversion information stored in the second set information DB 38 so as to rewrite color designation included in a drawing command of the print data obtained from the PC 1, from R, G, and B to R', G', and B', it is possible to easily perform the color conversion process.

The first embodiment can employ the following modification example.

Modification Example 1-1

Figure 9:
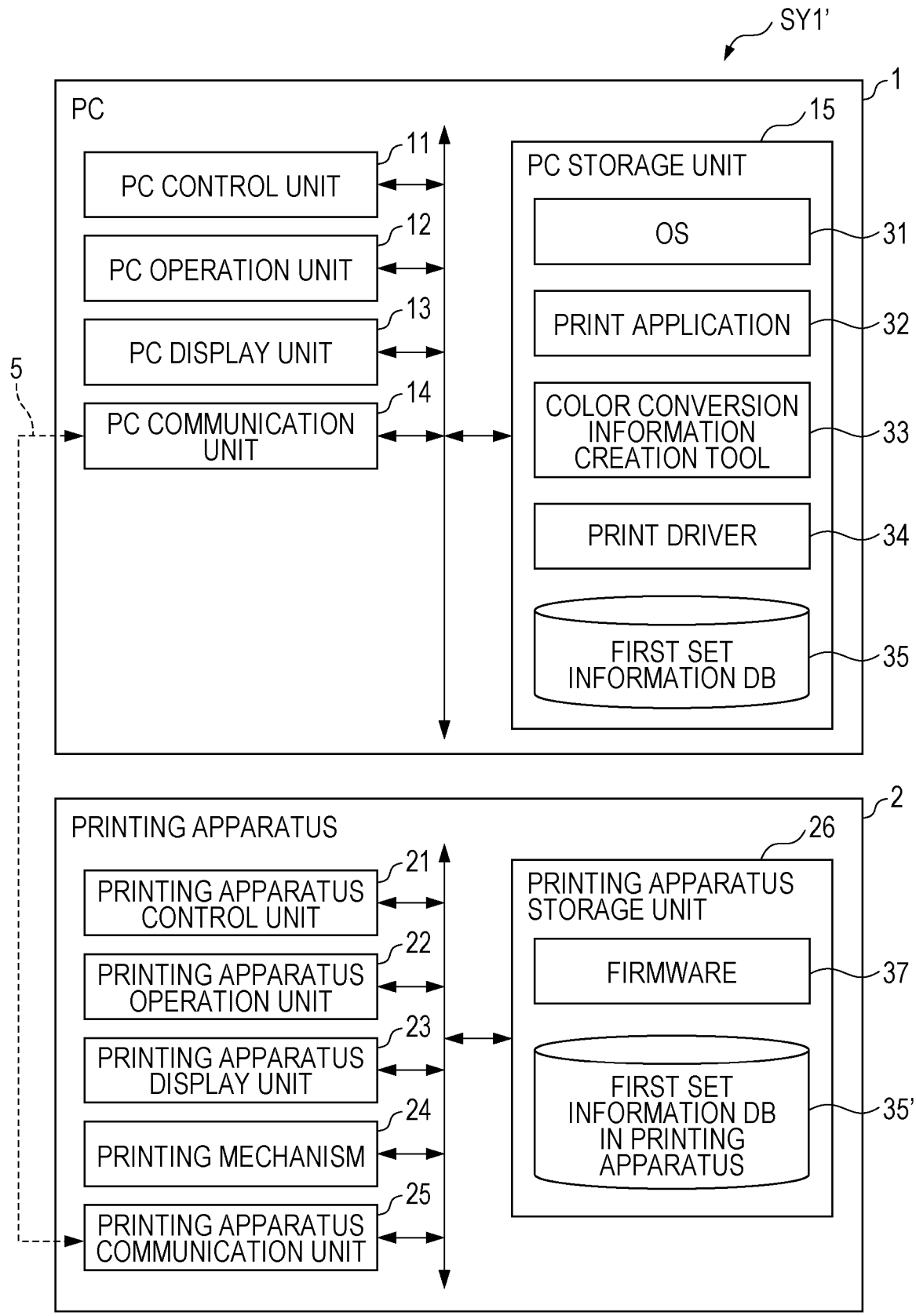
FIG. 9 is a block diagram of a first printing system according to a modification example of the first embodiment.

In the embodiment described above, the print setting screen D2 is displayed in the PC 1, but may be displayed in the printing apparatus 2. In the present modification example, the printing apparatus 2 is an example of "printing control apparatus" and "computer". Hereinafter, a difference of the present embodiment from the first embodiment will be mainly described. FIG. 9 is a diagram of a system configuration of a first printing system SY1' according to the present modification example. As compared with the first printing system SY1 (see FIG. 1) according to the first embodiment, the first printing system SY1' according to the present modification example has a difference in that a first set information DB in printing apparatus 35' is provided in the printing apparatus storage unit 26 of the printing apparatus 2, instead of the second set information DB 38. The first set information DB in printing apparatus 35' is an example of "storage unit". The same first set information as that in the first set information DB 35 in the PC 1 is stored in the first set information DB in printing apparatus 35'. Further, in the present modification example, the printing apparatus control unit 21 is an example of "print data obtainment unit", "print setting obtainment unit", and "control unit".

Figure 10:
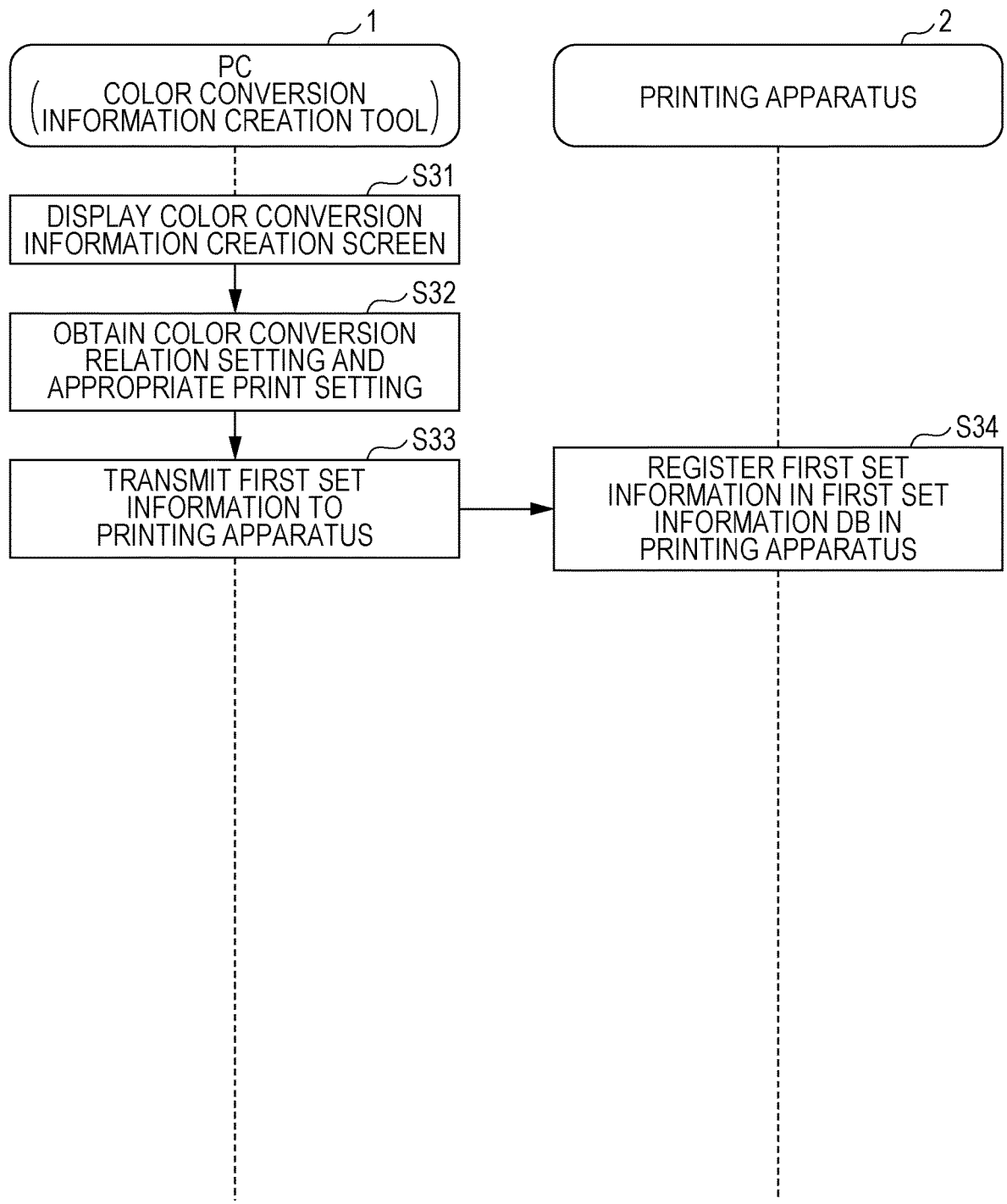
FIG. 10 is a flowchart illustrating a flow of a registration process according to the modification example of the first embodiment.

FIG. 10 is a flowchart illustrating a flow of a registration process according to the present modification example. The PC control unit 11 displays the first color conversion information creation screen D1 (see FIG. 2) (S31), and obtains a color conversion relation setting and an appropriate print setting by a user operation (S32). Further, the PC control unit 11 generates first set information based on the obtained color conversion relation setting and appropriate print setting, and transmits the generated first set information to the printing apparatus 2 (S33). The printing apparatus control unit 21 registers the first set information obtained from the PC 1, in the first set information DB in printing apparatus 35' (S34).

Figure 11:
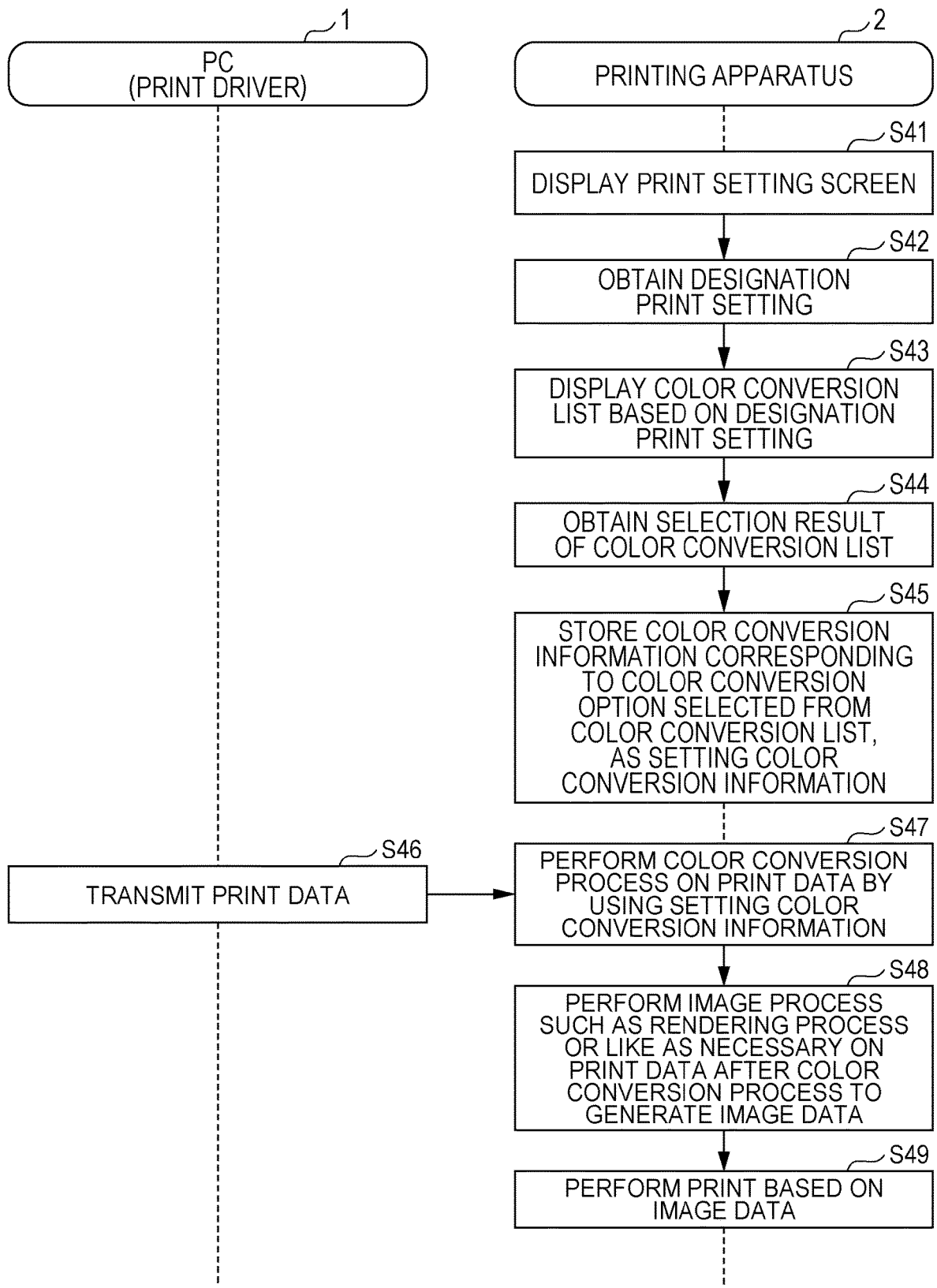
FIG. 11 is a flowchart illustrating a flow of a printing process according to the modification example of the first embodiment.

FIG. 11 is a flowchart illustrating a flow of a printing process according to the present modification example. The printing apparatus control unit 21 causes the printing apparatus display unit 23 to display the print setting screen D2 (see FIGS. 5 and 6) (S41), and obtains a designation print setting by a user operation (S42). In addition, based on the obtained designation print setting, the printing apparatus control unit 21 displays the color conversion list 72*a* in the color conversion information selection field 72 (S43). That is, the printing apparatus control unit 21 extracts one or more pieces of color conversion information corresponding to the obtained designation print setting from a plurality of pieces of color conversion information stored in the first set information DB in printing apparatus 35', and displays one or more color conversion options corresponding to the extracted one or more pieces of color conversion information in the color conversion list 72*a*. The printing apparatus control unit 21 obtains a selection result of the color conversion list 72*a* by a user operation (S44), and stores color conversion information corresponding to a color conversion option selected from the color conversion list 72*a* in RAM or the like in the printing apparatus control unit 21, as setting color conversion information (S45).

Thereafter, the PC control unit 11 transmits print data to the printing apparatus 2 (S46). Here, the PC control unit 11 transmits print data not including a registration number of the color conversion information and designation print setting information, to the printing apparatus 2. When the print data is obtained from the PC 1, the printing apparatus control unit 21 performs a color conversion process on the obtained print data by using the stored setting color conversion information (S47). Further, the printing apparatus control unit 21 performs an image process such as a rendering process on print data after the color conversion process as necessary so as to generate image data (S48), and performs print based on the generated image data (S49). Details in S47 to S49 are the same as those in S27 to S29 in FIG. 8.

In this manner, the first printing system SY1' according to the present modification example obtains a designation print setting in the printing apparatus 2, extracts one or more pieces of color conversion information based on the obtained designation print setting from a plurality of pieces of color conversion information stored in the first set information DB in printing apparatus 35', and displays one or more color conversion options corresponding to the extracted one or more pieces of color conversion information in the color conversion list 72*a*. Accordingly, even when a print setting for print data cannot be performed in the PC 1, it is possible to obtain the effect similar to that of the first embodiment. It is considered that a case in which a print setting for print data cannot be performed in the PC 1 includes a case in which it is difficult to replace or update the print driver 34 due to compatibility with the print application 32 or specifications of the PC 1.

Modification Example 1-2

Although a print setting is performed in the printing apparatus 2 in the modification example 1-1, the print setting may be performed in the PC 1 and the PC 1 may transmit print data including designation print setting information to the printing apparatus 2. In this case, the printing apparatus 2 obtains a designation print setting from the designation print setting information included in the print data, extracts one or more pieces of color conversion information based on the obtained designation print setting from a plurality of pieces of color conversion information stored in the first set information DB in printing apparatus 35', and displays one or more color conversion options corresponding to the extracted one or more pieces of color conversion information as color conversion options.

Modification Example 1-3

In the first embodiment, the first set information DB 35 is included in the PC 1 and the second set information DB 38 is included in the printing apparatus 2, but instead of the first set information, only a registration number and a name of color conversion information may be stored in the PC 1. Further, the first set information DB 35 may not be included in the PC 1 and the first set information DB 35 may be included in the printing apparatus 2, and the PC 1 may refer to the first set information DB 35 in the printing apparatus 2. Inversely, the second set information DB 38 may not be included in the printing apparatus 2, and the printing apparatus 2 may refer to the first set information DB 35 in the PC 1. Further, the first set information DB 35 may be stored in an external apparatus accessible by the PC 1 and the printing apparatus 2, and the PC 1 and the printing apparatus 2 may refer to the first set information DB 35 in the external apparatus.

Modification Example 1-4

In the first embodiment, when displaying color conversion options in the color conversion list 72*a*, a plurality of color conversion options are arranged according to an order of registration numbers of color conversion information, but the color conversion options may be arranged in an order other than the registration number order. For example, the PC control unit 11 may arrange one or more color conversion options corresponding to one or more pieces of color conversion information extracted based on a designation print setting, according to color information before conversion or color information after conversion. With this configuration, pieces of color conversion information in which pieces of color information before conversion or pieces of color information after conversion are similar to each other are displayed side by side, so that color conversion information is easily selected.

Further, as a color conversion option to be displayed in the color conversion list 72*a*, description of color conversion information may be displayed. For example, as a description, information related to a printout to which the color conversion information is applied, such as "medicine bag label for  pharmacy", "product label for  company", and the like may be displayed. Further, when color conversion information is used for a logo mark, the logo mark may be displayed together with the color conversion information as a color conversion option. In this case, a plurality of color conversion options may be displayed side by side according to the logo mark so that the same logo mark is continuously displayed.

Modification Example 1-5

In the first embodiment, a designation print setting designated by a user is obtained and based on the obtained designation print setting, one or more color conversion options corresponding to one or more pieces of color conversion information is displayed in the color conversion list 72a. However, not only the designation print setting designated by the user but also model information of the printing apparatus 2 may be obtained and based on the obtained model information, one or more color conversion options may be displayed in the color conversion list 72a. For example, in the first embodiment, the PC control unit 11 may obtain model information designated by the user, or may obtain model information from the printing apparatus 2 by inquiring the model information of the printing apparatus 2. Further, in the modification example 1-1, the printing apparatus control unit 21 may determine a model type of the printing apparatus 2, extract one or more color conversion options from the first set information DB in printing apparatus 35' based on a designation print setting designated by the user and the determined model type of the printing apparatus 2, and display the color conversion options in the color conversion list 72a. With this configuration, when one PC 1 is connected to a plurality of printing apparatuses 2 having different model types, the PC 1 may transmit the same first set information to the all of the printing apparatuses 2 and it is not necessary to generate first set information according to the model type.

Modification Example 1-6

In the first embodiment, a designation print setting is obtained by using the print setting screen D2 displayed based on the print driver 34, but the designation print setting may be obtained by using the print application 32. In this case, the PC control unit 11 generates print data including the designation print setting by using the print application 32. Further, the PC control unit 11 obtains print data including a designation print setting, based on the print driver 34 and displays a selection screen (not illustrated) including the color conversion information selection field 72 for selecting color conversion options, based on the designation print setting included in the print data. In addition, based on the print driver 34, the PC control unit 11 transmits print data including a designation print setting included in the print data and a registration number of color conversion information based on a selection result of the color conversion information selection field 72, to the printing apparatus 2.

Modification Example 1-7

In the first embodiment, the PC control unit 11 generates print data including a drawing command, but may generate print data described in a language other than that of the command. For example, the print data may be generated in a markup language such as an extensible markup language (XML).

Second Embodiment

Next, a second embodiment will be described. In the second embodiment, the printing apparatus 2 performs color conversion only on a designated conversion target in print data. Hereinafter, a difference of the present embodiment from the first embodiment will be mainly described. In the present embodiment, the same components as those in the first embodiment are denoted by the same reference numerals and detailed description thereof is omitted. Further, the modification example applied to the component similar to that in the first embodiment is also applied to the present embodiment in the similar manner.

Figure 12:
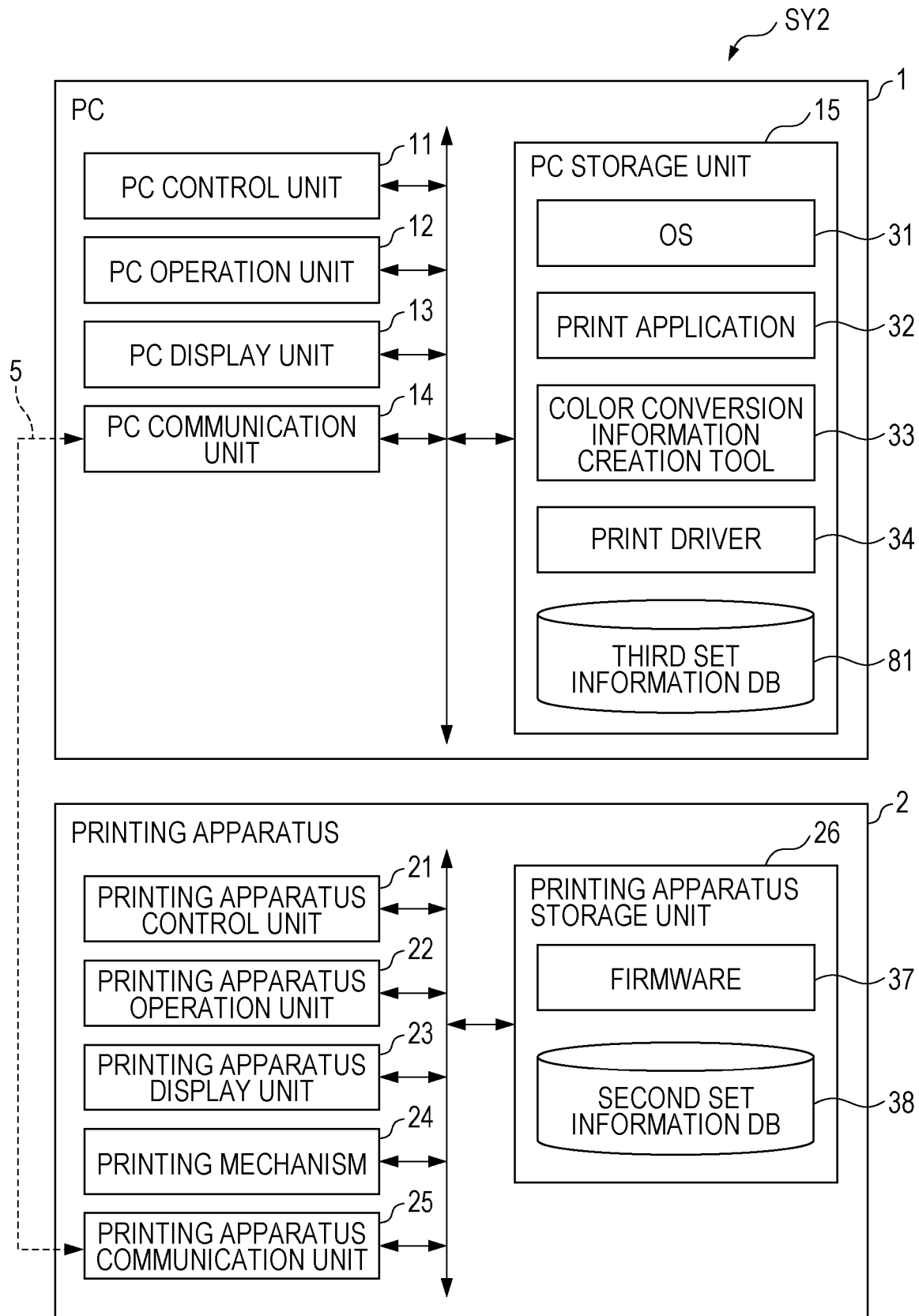
FIG. 12 is a block diagram of a second printing system according to a second embodiment.

FIG. 12 is a diagram of a system configuration of a first printing system SY2 according to the second embodiment. As compared with the first printing system SY1 (see FIG. 1) according to the first embodiment, the second printing system SY2 has a difference in that a third set information DB 81 is provided in the PC storage unit 15 of the PC 1, instead of the first set information DB 35. In the present embodiment, the PC control unit 11 is an example of "control apparatus control unit". Further, the second set information DB 38 is an example of "storage unit". In addition, the printing apparatus control unit 21 is an example of "print data obtainment unit". Further, the printing mechanism 24 is an example of "printing unit".

FIG. 13 is a diagram illustrating an example of third set information. The third set information is information obtained by deleting print setting information from information corresponding to the first color conversion relation information in the first set information (see FIG. 3), that is, the first set information.

Figure 14:
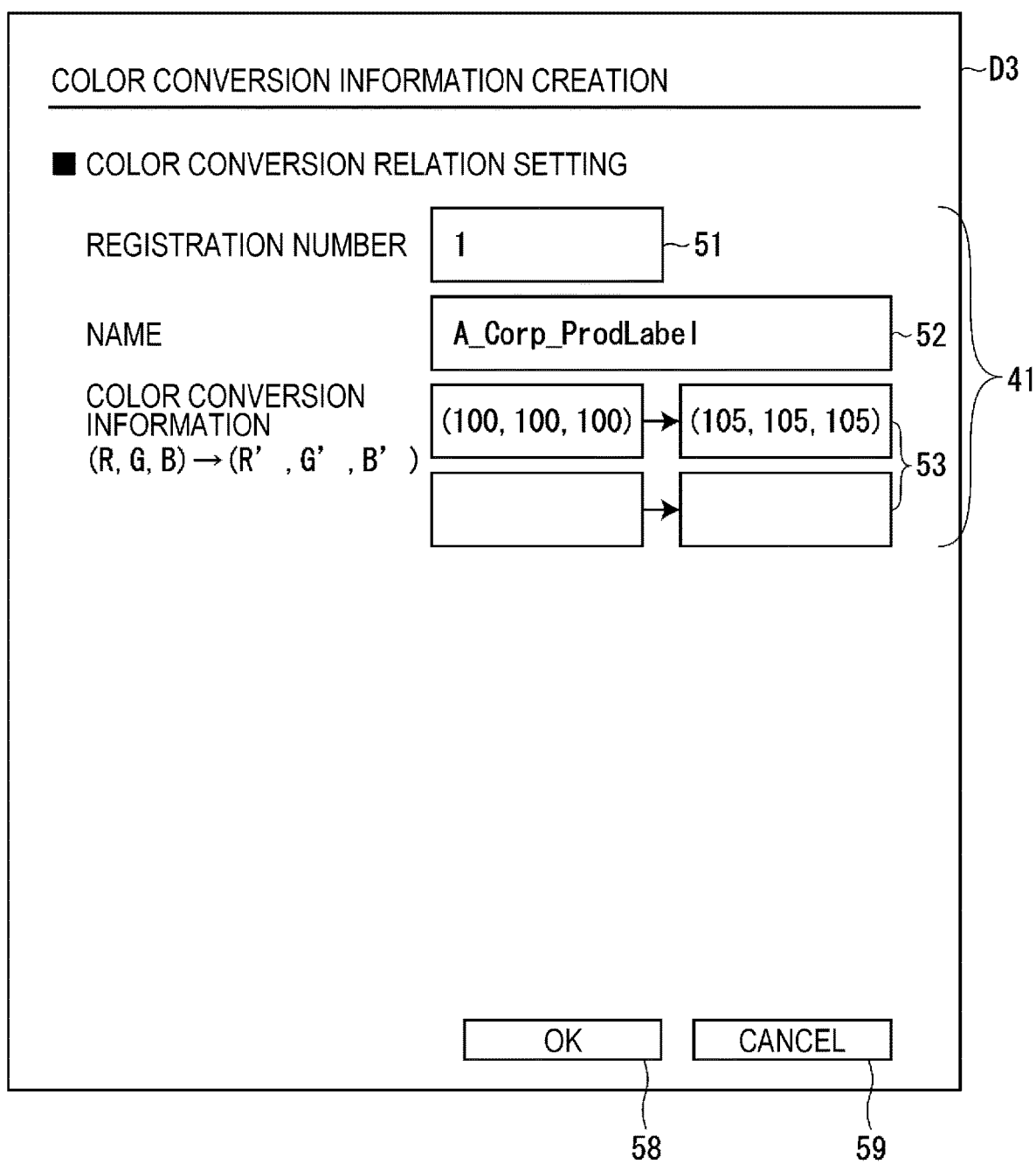
FIG. 14 is a diagram illustrating an example of a second color conversion information creation screen according to the second embodiment.

FIG. 14 is a diagram illustrating an example of a second color conversion information creation screen D3 according to the second embodiment. The second color conversion information creation screen D3 has a screen configuration obtained by deleting the print setting area 42 from the first color conversion information creation screen D1 (see FIG. 2) according to the first embodiment.

Figure 15:
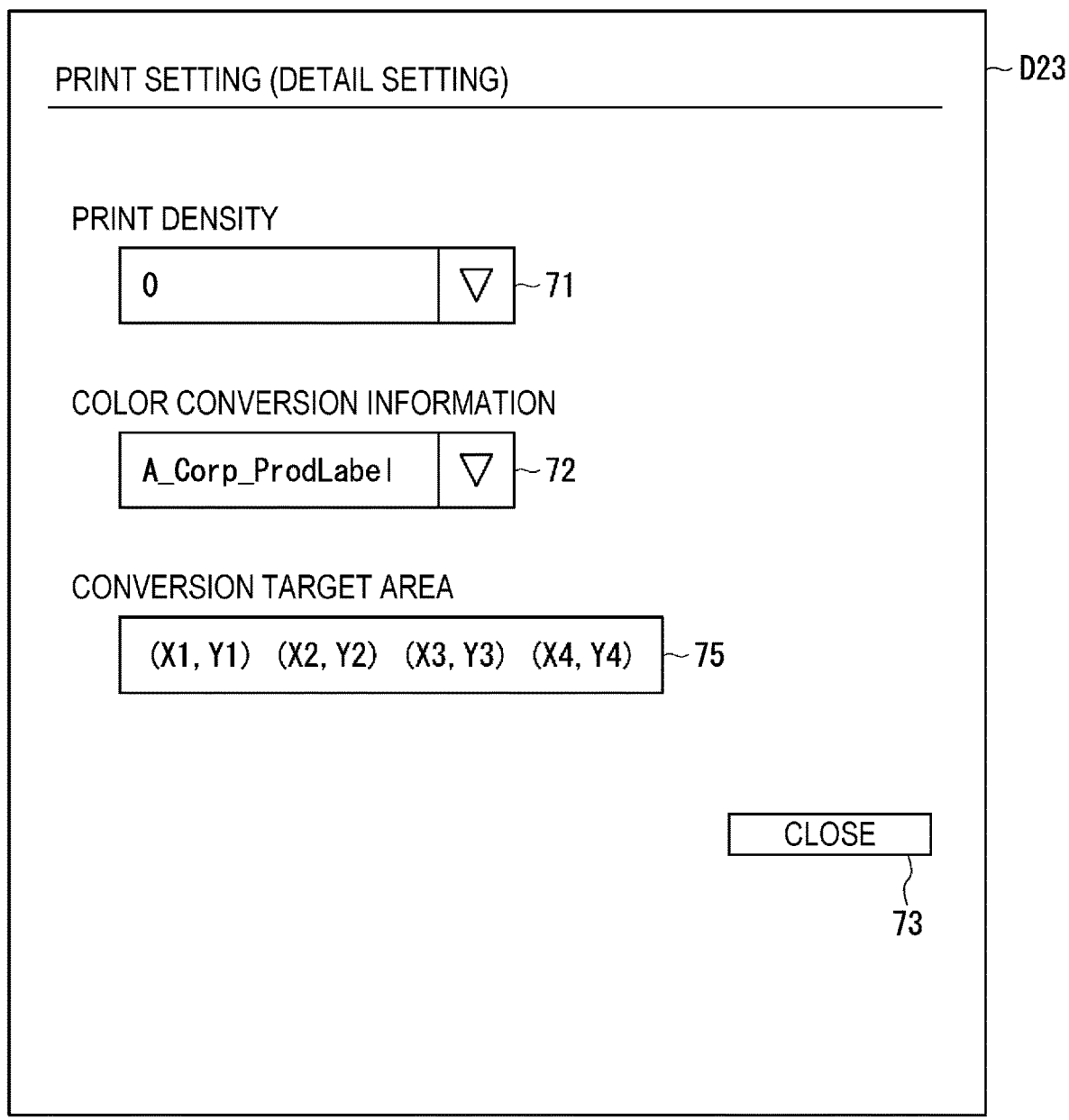
FIG. 15 is a diagram illustrating an example of a second detail setting screen according to the second embodiment.

FIG. 15 is a diagram illustrating an example of a second detail setting screen D23 according to the second embodiment. The main setting screen D21 (see FIG. 5) of the print setting screen D2 is the same as that in the first embodiment, and is not illustrated. The second detail setting screen D23 has a screen configuration obtained by adding a conversion target area designation field 75 to the first detail setting screen D22 (see FIG. 6) according to the first embodiment.

In the conversion target area designation field 75, an area to be converted for color conversion is designated in an image area E0 (see FIG. 18) of print data. Hereinafter, the area to be converted for color conversion is referred to as "conversion target area E1 (see FIG. 18)". In the present embodiment, four coordinates are designated in the conversion target area designation field 75. The printing apparatus 2 performs color conversion on a rectangular area having the four coordinates as vertices as the conversion target area E1.

Figure 16:
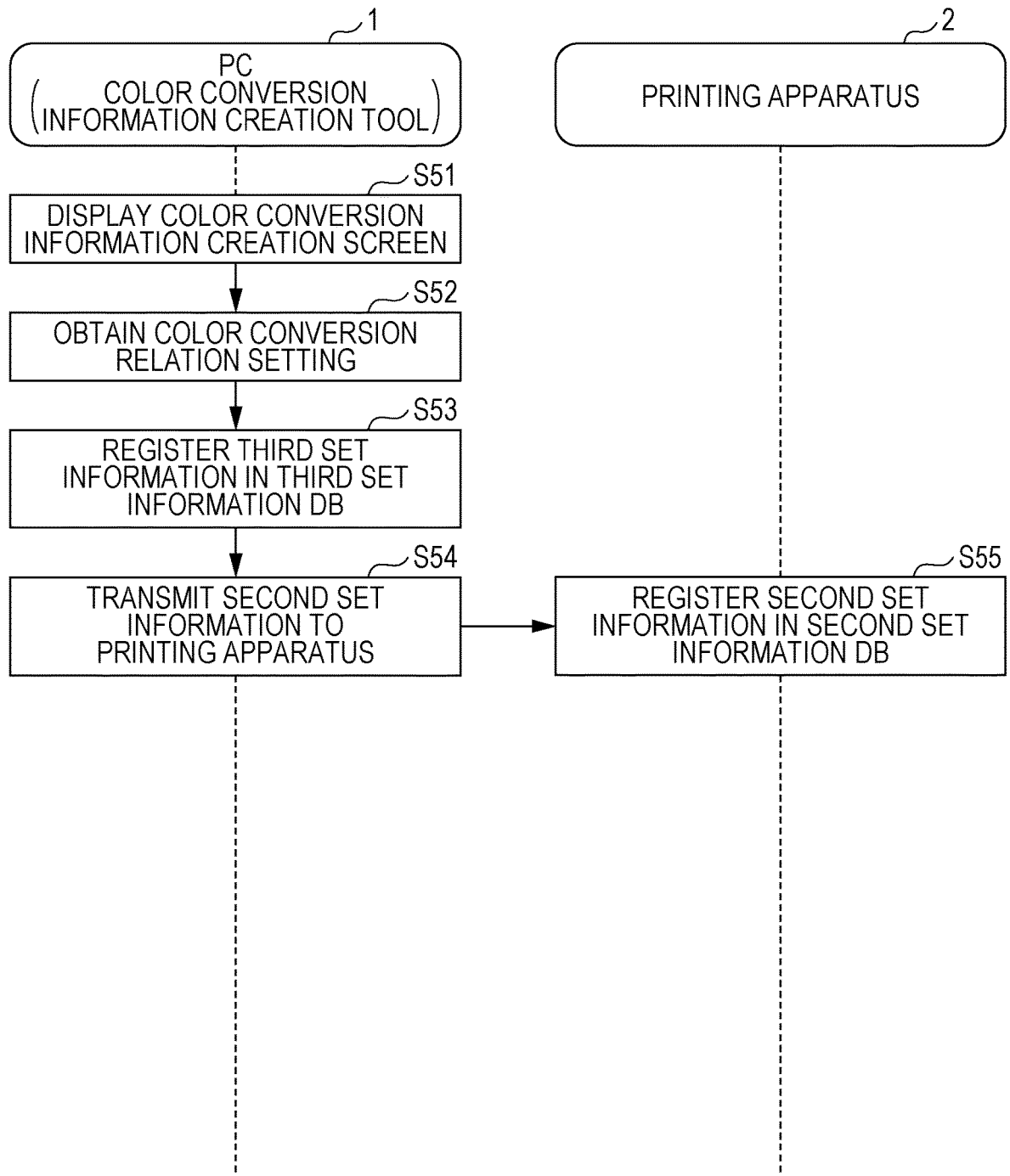
FIG. 16 is a flowchart illustrating a flow of a registration process according to the second embodiment.

FIG. 16 is a flowchart illustrating a flow of a registration process according to the second embodiment. The PC control unit 11 displays the second color conversion information creation screen D3 (see FIG. 14) (S51), and obtains a color conversion relation setting by a user operation (S52). Further, the PC control unit 11 generates third set information based on the obtained color conversion relation setting, and registers the generated third set information in the third set information DB 81 (S53). In addition, the PC control unit 11 transmits the second set information obtained by deleting a name from the third set information, to the printing apparatus 2 (S54). The printing apparatus 2 registers the second set information obtained from the PC 1, in the second set information DB 38 (S55).

Figure 17:
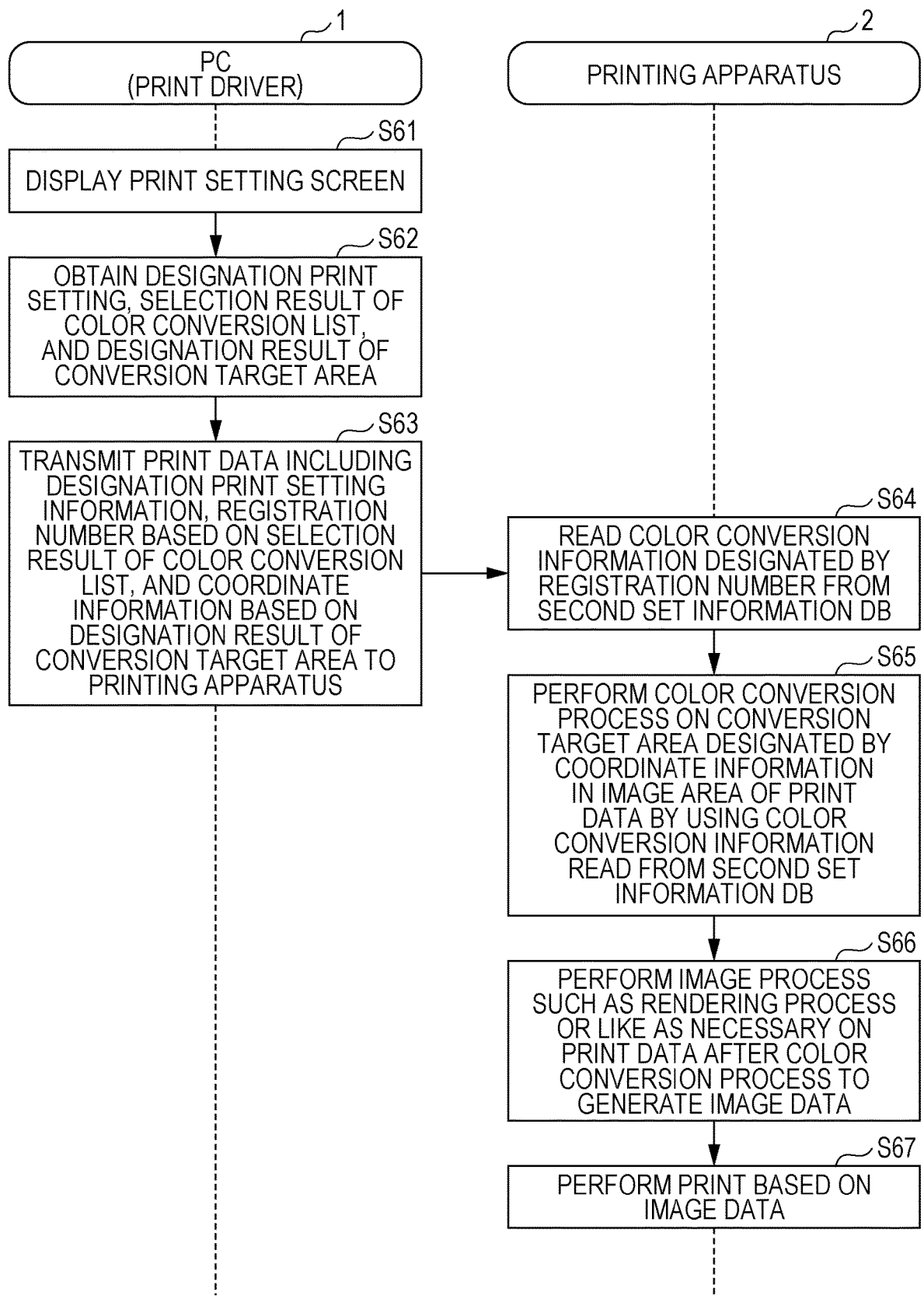
FIG. 17 is a flowchart illustrating a flow of a printing process according to the second embodiment.

FIG. 17 is a flowchart illustrating a flow of a printing process according to the second embodiment. Here, it is assumed that the third set information is registered in the third set information DB 81 and the second set information is registered in the second set information DB 38 by the registration process illustrated in FIG. 16.

The PC control unit 11 displays the print setting screen D2 (see FIGS. 5 and 15) (S61), and obtains a designation print setting, a selection result of the color conversion list 72a in the color conversion information selection field 72, and a designation result of the conversion target area E1 in the conversion target area designation field 75 according to a user operation (S62). The PC control unit 11 transmits print data including designation print setting information indicating the designation print setting, a registration number of color conversion information based on the selection result of the color conversion list 72a, and coordinate information based on the designation result of the conversion target area E1, to the printing apparatus 2 (S63). The registration number is an example of "second designation information", and the coordinate information is an example of "first designation information".

In the present embodiment, as header information of print data, the PC control unit 11 includes the designation print setting information, and the registration number and the coordinate information in the print data. Further, the print data includes a drawing command for drawing an image, a text, a figure, and the like.

Figure 18:
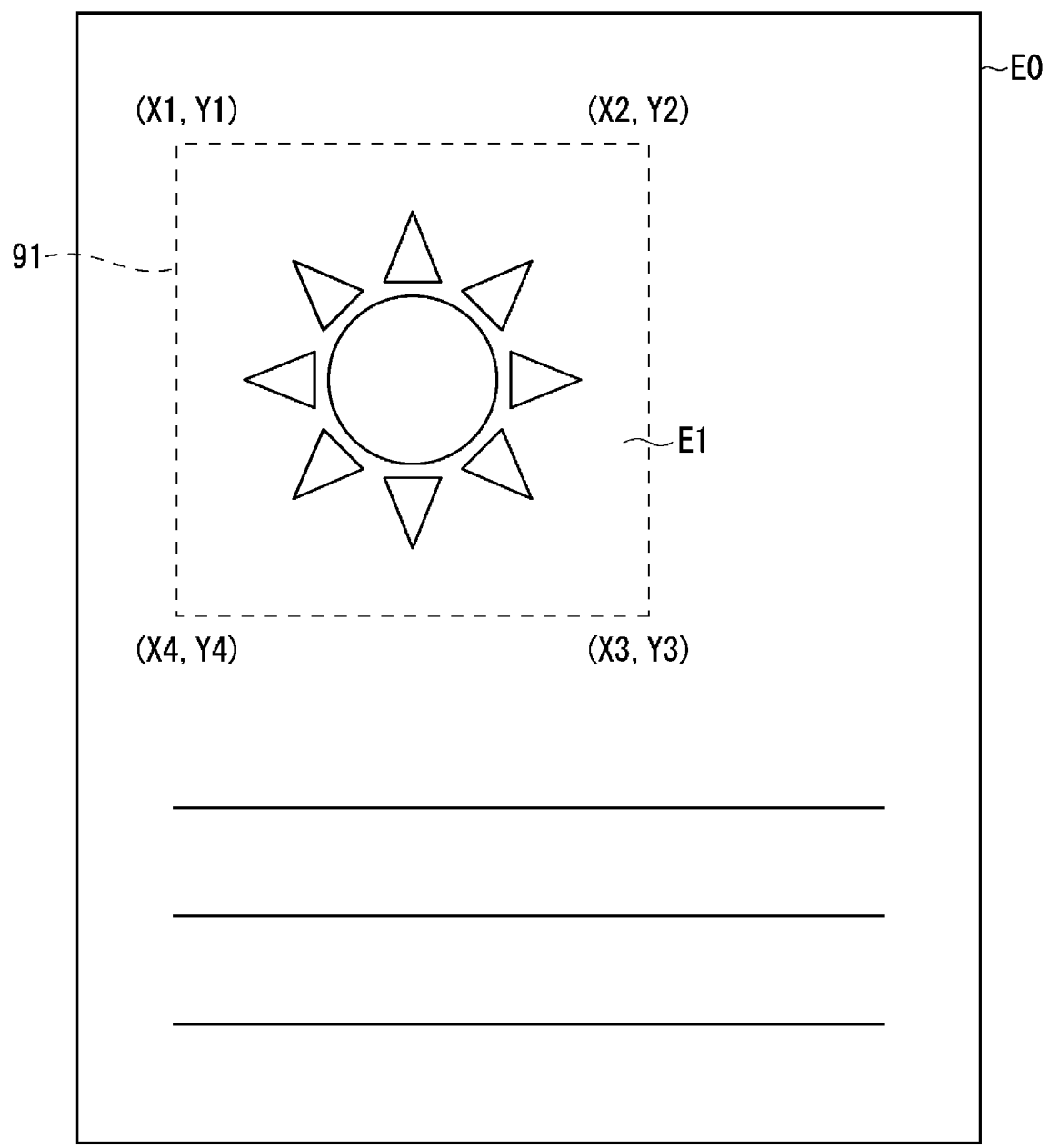
FIG. 18 is a diagram illustrating an example of an image area and a conversion target area in print data.

When the print data is obtained from the PC 1, the printing apparatus control unit 21 reads the color conversion information designated by the registration number, from the second set information DB 38 (S64). In addition, the printing apparatus control unit 21 performs a color conversion process on the conversion target area E1 designated by the coordinate information in the image area E0 of the obtained print data by using the color conversion information read from the second set information DB 38 (S65). For example, when the print data illustrated in FIG. 18 is obtained and (X1, Y1), (X2, Y2), (X3, Y3), and (X4, Y4) are designated as coordinate information, as illustrated in FIG. 18, an area surrounded by a frame 91 having the four designated coordinates as vertices in the image area E0 of the print data is the conversion target area E1. In this case, the printing apparatus control unit 21 performs a color conversion process based on the color conversion information designated by the registration number on the conversion target area E1, but does not perform the color conversion process based on the color conversion information designated by the registration number on an area other than the conversion target area E1, in the image area E0 of the print data.

When the color conversion process is completed, the printing apparatus control unit 21 performs an image process such as a rendering process on print data after the color conversion process as necessary so as to generate image data (S66). Further, the printing apparatus control unit 21 performs print, based on the generated image data (S67). Details in S66 and S67 are the same as S28 and S29 in FIG. 8.

As described above, since the PC 1 according to the second embodiment transmits the print data including the coordinate information of designating the conversion target area E1 for color conversion to the printing apparatus 2, the printing apparatus 2 performs color conversion only on the conversion target area E1 designated by the coordinate information, in the print data. For this reason, color conversion is not performed on a portion not desired by the user. In addition, since coordinate information is used as information for designating the conversion target area E1, it is possible to accurately designate an area desired by the user.

Further, since the PC 1 transmits the print data including the registration number for designating the color conversion information to the printing apparatus 2, it is possible to reduce the amount of data transmission as compared when the print data including the color conversion information itself is transmitted.

The second embodiment can employ the following modification example.

Modification Example 2-1

Figure 19:
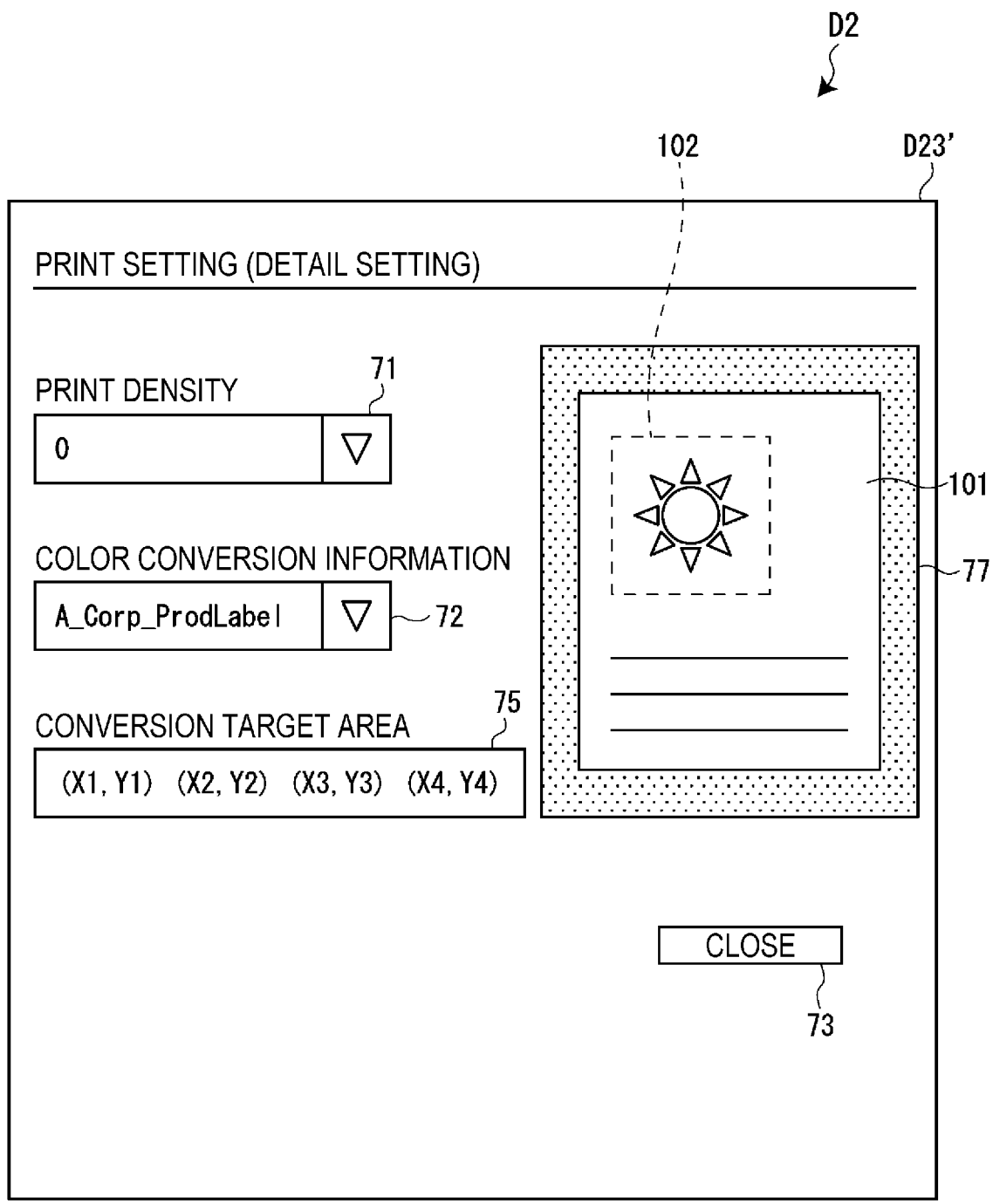
FIG. 19 is a diagram illustrating an example of a second detail setting screen according to a modification example of the second embodiment.

For example, a preview display may be performed on the second detail setting screen D23. FIG. 19 is a diagram illustrating an example of a second detail setting screen D23' according to the present modification example. The second detail setting screen D23' has a screen configuration obtained by adding a preview display area 77 to the second detail setting screen D23 (see FIG. 15) according to the second embodiment. In the preview display area 77, a preview display image 101 of print data is displayed. Further, in the preview display area 77, a range corresponding to the conversion target area E1 in the preview display image 101 of the print data is displayed with a dotted frame 102 or the like. The PC control unit 11 generates the preview display image 101 of print data which is a target of a print setting based on the print driver 34. More specifically, in the image area E0 of the print data, the PC control unit 11 performs a color conversion process on the conversion target area E1 based on coordinate information designated by the conversion target area designation field 75 by using color conversion information selected by the color conversion information selection field 72 so as to generate the preview display image 101. Further, the PC control unit 11 causes the PC display unit 13 to display the second detail setting screen D23' including the generated preview display image 101. In the present modification example, the PC display unit 13 is an example of "display unit". In this manner, according to the present modification example, it is possible for a user to estimate a print result of print data obtained by performing color conversion on the conversion target area E1 from a display on the second detail setting screen D23' without actually printing the print data on a printout, for a preview display.

Modification Example 2-2

In the second embodiment, the coordinate information is used as information for designating the conversion target area E1, but the conversion target area E1 may be designated by using information other than the coordinate information. For example, the conversion target area E1 may be designated by using information indicating an upper half area of print data, an upper left area when the print data is divided into four, or the like.

Modification Example 2-3

Further, instead of including information for designating the conversion target area E1 in print data, information for designating an object to be converted may be included in the print data. Hereinafter, information for designating the object is referred to as "object designation information". The object designation information is an example of "first designation information". As the object, for example, it is considered to designate a text, a figure, a line, or the like.

In this case, the second detail setting screen D23 is provided with an object designation field for designating an object to be converted instead of the conversion target area designation field 75. Further, based on a designation result of the object designation field, the PC control unit 11 transmits print data including the object designation information to the printing apparatus 2. The printing apparatus control unit 21 specifies a conversion target for color conversion, based on the object designation information included in the print data. For example, when the object designation information is information for designating a text, the printing apparatus control unit 21 rewrites color information only for the text, among objects included in the print data. That is, the printing apparatus control unit 21 rewrites the designated color information for a drawing command for drawing the text.

When the obtained print data is image data, the printing apparatus control unit 21 extracts a text target pixel by using a technology such as optical character recognition (OCR) and rewrites color information into the extracted text target pixel. Further, the printing apparatus control unit 21 does not rewrite color information for objects other than the object designated by the object designation information among the objects included in the print data.

Modification Example 2-4

In addition, coordinate information and object designation information may be combined as information for designating a conversion target. In this case, the coordinate information and the object designation information may be designated as an AND condition or an OR condition. For example, in the former case, the printing apparatus control unit 21 performs color conversion on an object designated by object designation information in the conversion target area E1 designated by coordinate information in the image area E0 of print data. Further, in the latter case, the printing apparatus control unit 21 performs color conversion on the conversion target area E1 designated by the coordinate information in the image area E0 of the print data and the object designated by the object designation information in the image area E0 of the print data.

As described above, the two embodiments are described, a method of executing each process of the PC 1 and the printing apparatus 2 described in each of the embodiments and the modification examples described above, a program for executing each process of the PC 1 and the printing apparatus 2, and a non-transitory computer-readable storage medium storing the program are also included in the scope of the disclosure. Further, each embodiment and each modification example may be combined.

In addition, instead of the PC1, various information processing terminals such as various tablet terminals, smart phones, and the like may be used. Further, the disclosure can be appropriately modified without departing from the gist of the disclosure, for example, by realizing each process of the PC 1 and the printing apparatus 2 by cooperation of hardware and software.

Appendixes

Hereinafter, appendixes to a printing control apparatus, a printing apparatus, a printing system, and a non-transitory computer-readable storage medium storing a program will be added.

The PC 1 includes the first set information DB 35 that stores a plurality of pieces of first set information including color conversion information for color-converting first color information into second color information different from the first color information and a print setting corresponding to the color conversion information in association with each other, and the PC control unit 11 that obtains a designation print setting which is a print setting designated for print data, displays the color conversion list 72a including one or more options of the color conversion information associated with the print setting corresponding to the obtained designation print setting based on the plurality of pieces of first set information stored in the first set information DB 35 on the PC display unit 13, and controls color conversion to be performed on the print data based on the color conversion information selected from the color conversion list 72a.

The first printing system SY1 includes the printing apparatus 2 that stores a plurality of pieces of color conversion information for color-converting first color information into second color information different from the first color information and the PC 1 that performs print control on the printing apparatus 2, the PC 1 includes the first set information DB 35 that stores a plurality of pieces of first set information including the plurality of pieces of color conversion information stored in the printing apparatus 2 and a print setting corresponding to the color conversion information in association with each other, and the PC control unit 11 that obtains a designation print setting which is a print setting designated for print data, displays the color conversion list 72a including one or more options of the color conversion information associated with the print setting corresponding to the obtained designation print setting based on the plurality of pieces of first set information stored in the first set information DB 35 on the PC display unit 13, and transmits the print data including designation information for designating the color conversion information selected from the color conversion list 72a, and the printing apparatus 2 includes the printing apparatus control unit 21 that reads the color conversion information designated by the designation information included in the obtained print data from the plurality of pieces of color conversion information stored in the printing apparatus 2, performs color conversion on the obtained print data based on the read color conversion information, and causes the printing mechanism 24 to execute printing based on image data obtained by performing color conversion on the print data.

The print driver 34 causes the PC 1, including the first set information DB 35 that stores a plurality of pieces of first set information including color conversion information for color-converting first color information into second color information different from the first color information and a print setting corresponding to the color conversion information in association with each other, to execute a step of obtaining a designation print setting which is a print setting designated for print data and a step of displaying the color conversion list 72a including one or more options of the color conversion information associated with the print setting corresponding to the obtained designation print setting based on the plurality of pieces of first set information stored in the first set information DB 35 on the PC display unit 13 and controlling color conversion to be performed on the print data based on the color conversion information selected from the color conversion list 72a.

With this configuration, the color conversion list 72a including one or more options of the color conversion information associated with the print setting corresponding to the obtained designation print setting among the plurality of pieces of color conversion information stored in the first set information DB 35 is displayed. For this reason, as compared when options of all color conversion information stored in the first set information DB 35 are displayed, it is possible to reduce the number of the options. Accordingly, it is possible to easily select the color conversion information and reduce the options.

The PC 1 is configured to communicate with the printing apparatus 2 which stores the plurality of pieces of color conversion information included in the plurality of pieces of first set information stored in the first set information DB 35, and the PC control unit 11 transmits the print data including designation information for designating the color conversion information selected from the color conversion list 72a.

With this configuration, since designation information for designating color conversion information instead of the color conversion information itself is included in print data to be transmitted to the printing apparatus 2, it is possible to reduce the amount of data transmission.

The printing apparatus 2 includes the first set information DB in printing apparatus 35' that stores a plurality of pieces of first set information including color conversion information for color-converting first color information into second color information different from the first color information and a print setting corresponding to the color conversion information in association with each other and the printing apparatus control unit 21 that obtains print data and a designation print setting which is a print setting designated for the print data, displays the color conversion list 72a including one or more options of the color conversion information associated with the print setting corresponding to the obtained designation print setting based on the plurality of pieces of first set information stored in the first set information DB in printing apparatus 35' on the printing apparatus display unit 23, performs color conversion on the obtained print data based on the color conversion information selected from the color conversion list 72a, and causes the printing mechanism 24 to execute printing based on image data obtained by performing color conversion on the print data.

With this configuration, the designation print setting is obtained in the printing apparatus 2 and the color conversion list 72a including one or more options of the color conversion information associated with the print setting corresponding to the obtained designation print setting among the plurality of pieces of color conversion information stored in the first set information DB in printing apparatus 35' is displayed. Accordingly, even when a print setting for print data cannot be performed in the PC 1, it is possible to perform the print setting in the printing apparatus 2. In addition, since it is possible to reduce the number of options of the color conversion information, it is possible to easily select the color conversion information and reduce the options.

In the printing apparatus 2, the print data includes a drawing command, and the printing apparatus control unit 21 performs the color conversion by rewriting color designation included in the drawing command.

With this configuration, the printing apparatus 2 can easily perform color conversion by rewriting color designation included in the drawing command.

What is claimed is:

1. A printing control apparatus that controls display on a display unit, the apparatus comprising:
    a storage unit configured to store a plurality of pieces of correspondence information, each piece of correspondence information including (1) a set of color conversion information among a plurality of sets of color conversion information for converting a first color into a second color different from the first color and (2) a print setting among a plurality of print settings, the print setting being associated with the set of color conversion information;
    a print setting obtainment unit configured to obtain a designation print setting, which is one of the plurality of print settings stored in the storage unit, designated for print data; and
    a control unit configured to:
        identify one or more sets of color conversion information associated with the obtained designation print setting based on the plurality of pieces of correspondence information stored in the storage unit;
        cause the display unit to display a color conversion list including the identified one or more sets of color conversion information associated with the obtained designation print setting; and
        control color conversion to be performed on the print data based on a set of color conversion information selected from the color conversion list.

2. The printing control apparatus according to claim 1, wherein
    the printing control apparatus is configured to communicate with a printing apparatus which stores a plurality of pieces of color conversion information included in the plurality of pieces of correspondence information stored in the storage unit, and
    the control unit configured to transmit, to the printing apparatus, the print data including designation information for designating the color conversion information selected from the color conversion list.

3. A printing apparatus comprising:
    a printing unit configured to execute printing;
    a storage unit configured to store a plurality of pieces of correspondence information, each piece of corresponding information including (1) a set of color conversion information among a plurality of sets of color conversion information for converting a first color into a second color different from the first color and (2) a print setting among a plurality of print settings, the print setting being associated with the set of color conversion information;
    a print data obtainment unit configured to obtain print data;
    a print setting obtainment unit configured to obtain a designation print setting, which is one of the plurality of print settings stored in the storage unit, designated for the print data; and
    a printing apparatus control unit configured to:
        identify one or more sets of color conversion information associated with the obtained designation print setting based on the plurality of pieces of correspondence information stored in the storage unit;
        cause a display unit to display a color conversion list including the identified one or more sets of color conversion information associated with the designation print setting, perform color conversion on the obtained print data based on a set of color conversion information selected from the color conversion list, and cause the printing unit to execute printing based on image data obtained by performing color conversion on the print data and based on the designation print setting.

4. The printing apparatus according to claim 3, wherein the print data includes a drawing command, and the printing apparatus control unit performs color conversion by rewriting color designation included in the drawing command.

5. A non-transitory computer-readable storage medium storing a program that causes a computer, including a storage unit that stores a plurality of pieces of correspondence information, each piece of correspondence information including (1) a set of color conversion information among a plurality of sets of color conversion information for converting a first color into a second color different from the first color and (2) a print setting among a plurality of print settings, the print setting being associated with the set of color conversion information, to execute:

obtaining a designation print setting designated for print data, the designation print setting being one of the plurality of print settings stored in the storage unit;

identifying one or more sets of color conversion information associated with the obtained designation print setting based on the plurality of pieces of correspondence information stored in the storage unit;

causing a display unit to display a color conversion list including the identified one or more pieces of color conversion information associated with the designation print setting; and controlling color conversion to be performed on the print data based on a set of color conversion information selected from the color conversion list.

* * * * *